United States Patent [19]

Baker et al.

[11] Patent Number: 4,849,232
[45] Date of Patent: Jul. 18, 1989

[54] COMPLETE POULTRY PRODUCT AND PROCESS OF MAKING

[75] Inventors: Robert C. Baker, Groton, N.Y.; Arturo H. Fugigaki, Iztacalco, Mexico; Choing-Liang Lu; Joseph H. Hotchkiss, both of Ithaca, N.Y.

[73] Assignee: Cornell Research Foundation, Inc., Ithaca, N.Y.

[21] Appl. No.: 168,639

[22] Filed: Mar. 4, 1988

Related U.S. Application Data

[63] Continuation of Ser. No. 892,170, Jul. 30, 1986, abandoned.

[51] Int. Cl.$^4$ .................. A23P 1/08; A23L 1/315; A23L 1/317
[52] U.S. Cl. ............................... 426/92; 426/274; 426/644
[58] Field of Search ............... 426/92, 274, 518, 644

[56] References Cited

U.S. PATENT DOCUMENTS

| | | |
|---|---|---|
| 1,427,438 | 8/1922 | Brickman . |
| 1,503,864 | 8/1924 | Vogt . |
| 2,766,122 | 10/1956 | George . |
| 3,036,922 | 5/1962 | Saverslak . |
| 3,076,713 | 2/1963 | Maas ........................ 426/272 |
| 3,100,710 | 8/1963 | Carlin ...................... 426/274 X |
| 3,173,795 | 3/1965 | Torr . |
| 3,268,339 | 8/1966 | Torr . |
| 3,499,767 | 3/1970 | Schlamb . |
| 3,595,682 | 7/1971 | Lind et al. . |
| 3,666,489 | 5/1972 | Lovell ....................... 426/92 X |
| 3,906,118 | 9/1975 | McFarland ............... 426/518 X |
| 3,911,154 | 10/1975 | Weatherspoon . |
| 4,309,450 | 1/1982 | Selbert . |
| 4,377,597 | 3/1983 | Shapiro et al. . |

FOREIGN PATENT DOCUMENTS 377256  7/1932  United Kingdom ............... 426/274

OTHER PUBLICATIONS

Vadehra et al., Food Technology, 24:42–55 (1970).

Ball et al., Abstracts of Papers, 73rd Annual Meeting of Poultry Science Assoc. 1984, pp. 60 and 61.
Marshall, "New Marketable Poultry and Egg Products", No. 6 Chicken Franks, Jan., 1961, Cornell University Agricultural Experiment Station, CU, Ithaca, N.Y.
Siegel et al., Journal of Food Science, 43:331–333.
Maesso et al., Journal of Food Science, 35:440–443 (1970).
Maesso et al., Poultry Science, 49:697–700 (1970).
Turner et al., Journal of Food Science, 44:1443–1446 (1979).
Siegel et al., Journal of Food Science, 44:1129–1131 (1979).
Solomon et al., Journal of Food Science, 45:283–287 (1980).
McFarlane et al., Journal of Food Science, 42:1603–1605 (1977).
Schmidt et al., Recent Advances in the Chemistry of Meat.
Arturo Hernandez, Master's of Science Thesis, Aug. 1985.

Primary Examiner—Donald E. Czaja
Assistant Examiner—Mary S. Mims
Attorney, Agent, or Firm—Jones, Tullar & Cooper

[57] ABSTRACT

This invention relates to a novel poultry product resembling a slice or chunk of poultry breast meat, but which in fact comprises two relatively thin slices of poultry breast meat having laminated between them comminuted e.g. mechanically deboned and/or ground poultry meat so as to provide a unitary product which appears as an integral piece of meat although its interior is actually comprised of many individual pieces of meat, bound together. The poultry product of the invention when served cold, at room temperature, or when heated for serving, can be sliced without a high degree of desintegration, crumbling or falling apart. Where poultry dark meat is used in the composite of the invention preferably the dark meat has been at least partially decolorized so that the visual effect upon viewing a cross section of the composite is one of a poultry white meat or at least relatively light meat product.

9 Claims, 1 Drawing Sheet

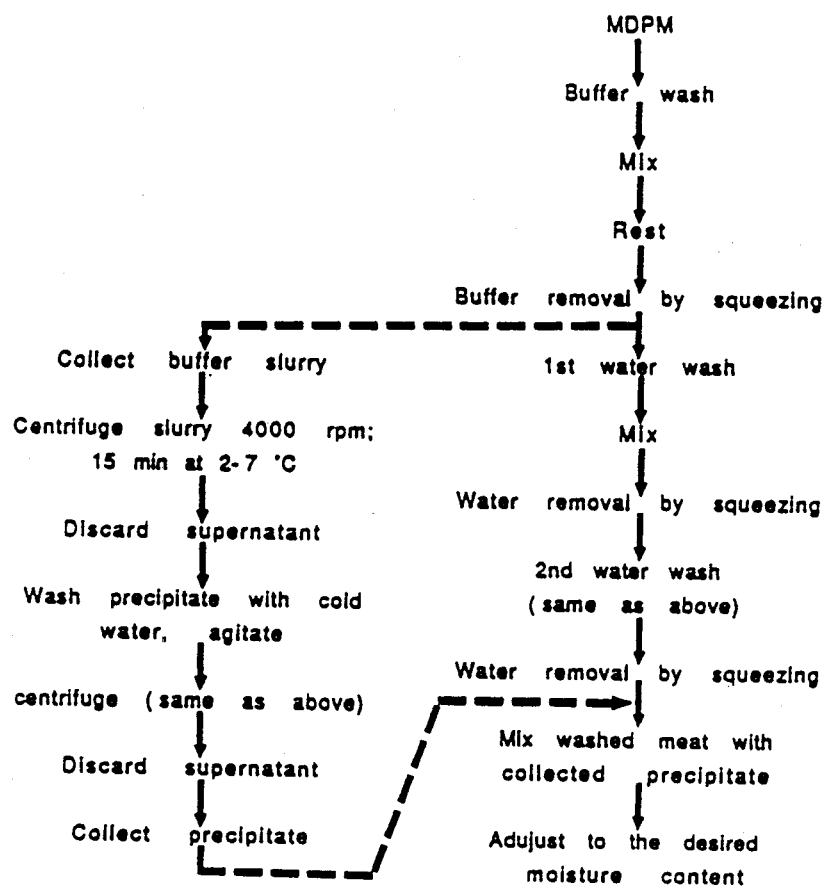
Figure 1: Flow diagram of the washing process incorporating the centrifugation of the buffer slurry

COMPLETE POULTRY PRODUCT AND PROCESS OF MAKING

This application is a continuation of application Ser. No. 892,170, filed July 30, 1986, now abandoned.

BACKGROUND OF THE INVENTION

The increasing demand for processed turkey and chickens, cut up chicken and poultry white meat in general, has raised the price of such cuts while at the same time creating a demand to find value-added uses for residual poultry parts such as wings, necks, thighs, backs and drumsticks. A substantial portion of these residual products become mechanically deboned poultry meat.

Mechanically deboned poultry meat (MDPM) is a finely comminuted paste that has mainly been used in the production of emulsion-type products like wieners and luncheon meats. Several constraints have limited its broader use: dark red color, small particle size (that results in poor texture properties) and short storage life.

The mechanical deboners most commonly used in the poultry industry can be classified in two groups: press-type and auger-type. These deboners are designed to accept raw or cooked materials and process as much as 6,000 lb/hr or as little as 500 lb/hr.

In the press-type deboners, bones with adhering meat are placed directly into the chamber of the machine without preliminary grinding or breaking. These deboners in general are batch producers, where a determined weight of meat and bones is fed into a thick-walled steel cylinder. A hydraulically-powered piston compacts the meat and bones under a pressure of 100 to 250 atm. Meat is forced through a set of microgrooves which the bones are unable to enter and are removed by the piston; examples of this kind of deboners are the Protecon and the Unilever.

Poultry processors in the United States and Europe predominantly use auger-type deboning machines, which can work on a one or two-stage continuous process. In the two-stage, the raw materials are first chopped into smaller portions after which the edible meat or soft tissue is separated from the bone via stainless steel screens (Yieldmaster) or via microgrooves (Paoli).

The one-stage auger deboners are the newest type on the market. In these deboners no preliminary grinding is required.

The recovered meat yields of auger-type deboners by weight of material fed, as reported by the manufacturers are 92% for whole fish; 50% for fish frames, 55% for lobster bodies, and 65% for whole poultry carcasses. A whole carcass gives a higher yield than just parts. However, the new one-stage auger-type Paoli deboner claims a yield of 60-75% in fryer necks and backs; 50-65% in poultry carcasses and 42-67% in turkey carcasses. The Beehive Rotatory Separator claims to achieve the following yields: turkey frames 65%, turkey necks 63%, and whole birds 75-89%, by weight.

The proximal composition of meats is affected by the mechanical deboning process. Part of the lipids and heme compounds of the bone marrow end up in the mechanically separated meat. The incorporation of these materials substantially increases the lipid fraction of the final product by diluting the fractions of other components. Reports on the proximal composition of mechanically deboned poultry meat vary widely from author to author; much of the variability relating to such factors as the age of the bird, bone to meat ratio, cutting methods, deboner settings, skin content, and protein denaturation (Froning, *Food Technology*, 9:50–63 (1976); Essary, *J. Food Sci.*, 44:1070–1073 (1979).

The shearing forces present in the mechanical deboning process cause considerable damage to the cellular structure of the tissues. As a result, the product obtained from mechanical deboning is a very fine meat puree which lacks shape and texture. Poor texture properties in MDPM are related to the loss of the integrity of the myofibrils which are heavily fragmented during the deboning process. Schnell et al, *Poultry Sci.*, 53:416–419 (1974) studied the ultrastructure of MDPM. Using a deboner with screen sizes of 0.1575, 0.1016 and 0.0508 centimeters it was found that a decrease in screen size caused a loss in the integrity of the myofibrils. In other words, the characteristic size of the myofibrils showed more damage when a smaller screen was used. Breaks occurred in the Z and M lines. Once broken, further structural disintegration occurred with the shearing forces that produced particles which were spherical or oval in shape. Valdehra and Baker, *Food Tech.*, 24:42 (1970) reported that histologically, no intact muscle fiber has been observed in commercially deboned neck and back meats.

Studies by Satterlee et al, *J. Food Sci.*, 36:979–981 (1971), and Froning et al, *J. Food Sci.*, 38:279 (1973) which varied the skin percentage of broiler backs going into the deboner showed that as the skin percentage of the backs increased, the fat content of the MDPM increased. This increase in fat affected the percentage of protein, moisture and bone fractions in the final product as well. Results showed that most of the fat went into the edible product rather than into the bone residue; conversely, the protein collagen was mostly found in the bone residue. This showed that most of the skin protein did not pass through the deboner screen.

In order to maintain certain parameters of quality, the U.S. Department of Agriculture has ruled that mechanically deboned meat (MDM) has to have no less than 14% protein, no less than a 2.5 Protein Efficiency Ratio (PER) and no more than 30% fat (Federal Register, 1985).

Some of the recommended ways to increase or improve the texture and emulsifying characteristics of the MDM are achieved with the addition of hand deboned meat, structural protein fibers (soy protein), and other ingredients. The addition of intact meat fibers will impart better texture to the final product. In finished products such as meat rolls, meat balls and coarsely ground sausages, approximately 25% of the total ingredients has been structural protein fibers (Kumar et al, *Avian Res.*, 67:108–115 (1983). A problem with structural protein fibers is that they impart a distinctive soy flavor at high levels.

The color of meat is influenced by several factors starting from animal husbandry practices to the final conditions under which the meat is displayed on the retail level. In general, the chemistry of the color in meat is primarily due to the muscle protein myoglobin. Differences in color can be measured using appropriate equipment; one such apparatus is the Hunterlab Color Difference Meter which measures color in foods. It defines color in terms of lightness (L); and two chromaticity dimensions—(a) from green to red and (b) from blue to yellow. Lightness values range from 100 to 0, where 100 represents perfect white and 0 strands for black. The chromaticity dimensions (a and b) give certain designations of color as follows: "a" measures red when positive, gray when zero, and green when negative; while "b" measures yellow when positive, gray when zero and blue when negative (Mackinney and Little, Color of Foods, AUI Pub. Co., Westport, Conn. 1962). From these values the hue angle (H°) and the saturation (S) can be calculated (MacDougall, *Food Chem.*, 9:75–88 (1982)).

The pigments responsible for color of meat are heme pigments contained in the proteins myoglobin and hemoglobin.

In the structure of the heme pigment itself the chemical state of the cental iron present strongly influences the meats' color.

The iron in the heme group can be present in either a ferrous or oxidized ferric state. To maintain a desirable color in meat, myoglobin must remain in a ferrous form.

Several methods have been tried for the extraction and quantification of the heme pigments. Heme pigments are usually chemically converted to specific and more stable derivative for their measurement. Hornsey's method, *J. Sci. Food and Agric.*, 7:534–540 (1956) transformed the heme t hematin and Warris' method *Analyt. Biochem.*, 72:104–112 (1976) changed the heme into a cyanmet form developed from cyanide salts. Early experiments attempted to extract the heme pigments in meat with water washings. Studies by Poel, *Am. J. Physiol.*, 156:44 (1949), and Fleming et al, *J. Am. Sci.*, 19:1164–1171 (1960) have indicated that water did not remove the pigments completely. Watson, *Biochem. J.*, 29:2114–2120 (1935) tried several phosphate buffers and he found that alkaline phosphate buffers were helpful in removing the pigments, but their filtrate was turbid. Therefore, he was unable to make accurate readings of the pigment concentration. However, when acid phosphate buffers were used, they produced a clearer filtrate. He finally recommended two washings with a 0.067M phosphate buffer at a pH of 6.5 to remove the heme pigment from meat.

Tested methods for the extraction of heme pigments include DeDuve's method, *Acta Chemica. Scand.*, 2:264 (1948) and Hornsey's method, supra (1956). In DeDuve's method, the pigment was removed by using a 0.01N acetate buffer at a pH of 4.5. In this method the extract was clear; however, 5 to 30% of the total pigment remained unextracted from the muscle. In Hornsey's method several acetone/water ratios were used to remove the heme pigments. In this procedure the ratio of acetone/water was found to be critical in the amount of pigment washed out. Maximum extraction was obtained at a 4:1 acetone/water ratio. The addition of hydrochloric acid in the acetone solvent converted the heme pigments into a stable hematin derivative, which then allowed measurements to be recorded. The same findings were reported by Hagerdal et al, *J. Food Sci*, 42:1258–1263 (1977).

Warris, *J. Food Tech.*, 14:75–80 (1979) investigated the pigment removal using a phosphate buffer with the further addition of sodium cyanide and potassium ferricyanide. These compounds converted the heme pigments to a stable cyanmet form. After that, readings on the clarified solutions were made at 540 nm to determine the total pigment extracted. In 1979 Warris tried various buffers having different values of pH to remove heme groups. He concluded that the best extracting buffer was a 0.04M phosphate buffer at a pH of 6.8. Moreover he proved once again that water and buffers of a low pH resulted in the inability of up to 45% of the pigments to be extracted. According to Warris the maximum pigment extraction was achieved by buffers having a pH above 6.8 but the clarification of the solutions caused some difficulties. All extracts obtained were impossible to clean by centrifugation. Unlike previous studies which used two washings, he demonstrated that a single extraction was sufficient to remove all of the soluble pigment. Finally, he established that the pH for the extracts was lower than the original buffer solution used due to the buffering capacity of meat.

Due to most consumers' preference for white meat in poultry, some experiments have been done recently aimed at obtaining white meat from red parts. The possible use of bleached red muscle in white meat-products will greatly decrease costs and utilize expensive wasted protein. Ball et al, Abst. of Papers, 73rd Ann. Meet., Poultry Sci. Assoc., Ont. Canada (1984) tried different extracting media such as: tap water, sodium bicarbonate (pH 8.45), and sodium acetate (pH 5.25) to remove pigments from the thigh meat of broilers. They reported that by washing the meat in these different solutions the pigment was reduced from 73 to 88%, depending on the specific chemical applied. In addition, their study indicated that the washing step affected nutrient levels; niacin was lost at a level of 54.7 $\mu$g/g and thiamine at 0.88 mg/g. A sensory study carried out by the above authors showed that the washed tissue was judged in color between breast meat and thigh meat.

Acton, (through personal communication) (1984), has been using oxidizing agents to bleach meat. These three agents are: hydrogen peroxide, sodium bisulfite, and ascorbic acid. The sodium bisulfite solution left a sulfur-like taste in the washed product, which was not found in the meat treated with hydrogen peroxide or ascorbic acid. Further study is indicated in the use of oxidizing agents, especially when applied to MDPM because of the possible acceleration of lipid oxidation causing off-flavors, or composition damage of amino acids in the final product. Additional research is required for evaluating the effect of washing and bleaching agents in the overall nutritional quality and storage stability of the final products.

The possibility of using mechanical deboners in foods was first tested in the fish industry. Similarly to MDPM, the mechanically deboned fish has found broad utilization in several food products. In Japan, the mechanically deboned fish has been extensively used in the elaboration of kamaboko products and surimi. Kamaboko, used as a generic term, identifies different rubbery and sponge-like fish cakes (Okada et al, *Marine Fisheries Rev.*, 35:1–6 (1973)). Kamboko products have enjoyed a wide popularity in Japan for many centuries; documents from the 15th century mention the methods used in its preparation.

The process of kamaboko involves the grinding of washed fish muscle with starch, sugar, and salt to form a sticky paste. The paste then can be boiled, steamed, broiled or deep-fried. Kamaboko is called by different names depending on the type of cooking, shape and ingredients of the final product.

At the Hokkaido Fisheries Laboratory, in 1959, Nishiya and Takeda developed a process for preparing surimi, a semi-processed fish protein that has revolutionized the kamaboko industry. The initial steps of the surimi process are similar to those of kamaboko: the raw fish has the head and internal organs removed, and then it is filleted, minced, and washed. After that the water is extracted and the resultant paste is strained. However, unlike kamaboko method, certain additives are incorporated in the straining step of surimi production. The surimi paste is shaped in rectangular blocks, packaged, and frozen. The additives added during straining cause the muscle proteins to retain their functional properties longer during frozen storage.

The fish meat is collected and mixed with cold water (0° C.) 7-8 times its volume. After a short mixing, the flesh is allowed to settle and the supernatant is discarded. The washing step removes unpleasant fishy odors, fat, blood, and flesh pigments. It also removes water soluble proteins, thus improving the elasticity or "ashi" of the final product (Okada et al, supra, 1973). This washing step is repeated 3 to 5 times. During the final washing the water is removed from the minced fish by the use of a screw press or a centrifuge. The final moisture content is 84–86%. The number of washing steps and the volume of water used in each step will vary according to the species of fish, the initial condition of the raw material, the type of washing unit utilized, and the quality of surimi desired (Lee, Food Tech., 38:69-80 (1984)).

There is a major difference in procedures used for processing surimi on shore and that manufactured at ship factories. Due to the limitations in the amount of fresh water available at a ship factory, the washing step is only done once and the ratio of fish meat-water is 1:3 or 1:4.2

The following references which relate to meat process are of background interest:

Valdehra et al, Food Tech., 24:42-55 (1970), reviews the mechanism of heat initiated binding of poultry meat; U.S. 3,076,713, to Maas, relates to mechanically working the surface of meat pieces until a creamy, tacky exudate forms and then pressing the pieces together; Schmidt et al, Recent Advances in the Chemistry of Meat, pp 231-245 (1984), reviews in detail various aspects of meat binding including mechanical treatment which causes both increased fiber description and the release of binding proteins; Siegel et al, J. Food Sci., 43:331-333 (1978), compares massaging meat surfaces and various chemical treatments on the quality of composite hams; Maesso et al, J. Food Sci., 35:440-443 (1970), studies the effects of physical and chemical treatments on binding of poultry meat pieces. Beating enhanced binding in all cases; Maesso et al, Poultry Sci., 44:697-700 (1970), looks at vacuum, pressure, pH and meat type as they affect binding; U.S. Pat. No. 3,499,767, to Schlamb, describes forming small pieces of poultry into large pieces by breaking the surface cells of the small pieces by mechanical action and binding through the action of released soluble proteins; Marshall, "New Marketable Poultry and Egg Products 6. Chicken Franks" A.E. Res. 57, January 1961, Cornell Univ., shows the formula for chicken franks and reports market studies; U.S. Pat. No. 1,427,438 to Brickman, shows using processed pork rind to hold two pieces of pork together; U.S. Pat. No. 1,503,864, to Vogt, shows making a boneless boiled ham; U.S. Pat. No. 2,766,122, to George, relates to recovering and using the edible flavor portion of a turkey; U.S. Pat. No. 3,036,922, to Saverslak, relates to the use of gluten as a poultry meat binder; U.S. Pat. No. 3,173,795, to Torr, relates to using poultry skin comminuted to fibriform consistency as a matrix to bind meat pieces; Turner et al, J. Food Sci., 44:1443-1446 (1979), studies the action of myosin as a meat binder; Siegel et al, J. Food Sci., 44:1129-1131 (1979), studies the action of myosin as a meat binder; Solomon et al, J. Food Sci., 45:283-287 (1980), looks at the effect of vacuum and mixing time on processing beef; MacFarlane et al, J. Food Sci., 42:1603-1605 (1977), studies the action of various specific proteins on meat binding; U.S. Pat. No. 3,595,682 to Lind et al, relates to a turkey roll employing turkey skin as an outer casing; U.S. Pat. No. 3,911,154 to Weatherspoon, teaches a composite meat product comprising a unitary outside stuffed with a mixture of meat ingredients the inside of the unitary cover is treated with salt and mechanically tenderized; U.S. Pat. No. 4,309,450 to Seibert, describes a seafood product from a composite exudate: U.S. Pat. No. 4,377,597 to Shapiro et al, describes a restructed meat product from meat chunks and alongated thin strips of meat; U.S. Pat. No. 3,268,339 to Torr, describes a poultry product made by mixing a fibriformed mass and chunks of raw meat to form a coherent mass. The fibriformed mass comprises skin preferably mixed with dark meat.

DESCRIPTION OF THE INVENTION

This invention relates to a novel poultry product resembling a slice or chunk of poultry breast meat, but which in fact comprises two relatively thin slices of poultry breast meat having laminated between them comminuted or ground poultry meat (i.e. filler material) so as to provide a unitary product which appears as an integral piece of meat, although its interior is actually comprised of many individual pieces of meat, bound together. The poultry product of the invention when served cold, at room temperature, or when heated for serving, can be sliced without disintegration, crumbling or falling apart.

Where poultry dark meat is used in the composite of the invention, preferably the dark meat has been at least partially decolorized so that the visual effect upon viewing a cross section of the composite is one of a poultry white meat or at least relatively light meat product.

It has been discovered that up to about 35% preferably 25% and most preferably 20% by weight of filler material can be mechanically deboned poultry meat without unduly detracting from the sensory impression of a quality product. For example up to about 20% MDPM cam be added to ground breast meat without any noticeable diminution of quality. If desired, more deboned poultry meat, up to almost 50% of the filler, can be employed with some loss of texture.

The major portion of the filler material comprises ground poultry meat preferably having a grind between about 0.2 and 0.7 cm. The presently preferred formulations employ a 0.5 cm grinding. The grind size is not absolutely critical; however, where grinds above about 0.7 cm are employed air pockets in the filler and between the filler and the outside slice begin to present themselves. Typically the source of this ground meat, in addition to the breast, are the thigh and scapular meat.

The use of MDPM while reducing the cost of the product has several additional advantages. The small pieces of mechanically worked meat increase the binding within the filler and the binding between the filler and the solid slices. Likewise, the use of MDPM helps eliminate air pockets within the filler and helps to avoid spaces between the filler and the solid slice of meat.

If desired, in addition to the MDPM (or in place thereof), the filler composition can contain up to about 10% ground poultry skin. The poultry skin serves as a binder for the ground poultry meat.

In the overall process of the invention thin slices of poultry breast meat are mechanically worked for a time sufficient to increase the binding action of the meat surface without destroying the overall integrity of the thin slice. Filler material comprising ground or similarly comminuted poultry meat is then placed between two such mechanically worked slices and the composite compressed to form a unitary product. The product can then be cooked immediately or frozen uncooked. As the binding action is enhanced by cooking it is preferable that the product be cooked then frozen for transit in commerce.

The presently preferred method of forming the mechanically worked thin slice is to cut and freeze the slice and then mechanically work the thin frozen slice. For example, the frozen slice can be rubbed by hand using a rubber knife for about one-half minute or for a time sufficient to case the formation of an exudate or paste on the surface of the slice. (At the same time the surface is roughened causing fibers to extend from the surface.)

Rather than being worked by hand, the slice can be similarly worked by a suitable machine. Alternatively, the surface of a large piece of breast meat can first be mechanically worked and then the slice cut or sawed from the large piece, thereby creating a slice with one mechanically worked side. In yet another alternative embodiment, fibers or other binding site discontinuities are created on the surface of the slice by penetrating the slice either partially or completely through with a plurality of needles or the like so that binding exudate from the filler will penetrate and bind to the slice. Typically the thickness of the breast meat slice employed in the composites of the invention is between about 0.13 cm to about 0.5 cm and preferably between about 0.15 cm and about 0.3 cm.

While thicker and/or multiple layered products are contemplated, the presently preferred composites resemble a slice of poultry breast and thus have a thickness of about 1.5 cm or less. Typically the weight ratio of filler to outside slice meat is between about 1.1 to 2.5 and preferably between about 1.7 to 2.0. Where thicker pieces are contemplated it is preferable that additional internal slices of breast meat be interlayered between layers of filler material.

In the process of the invention the performed filler material is placed between two mechanically worked breast meat slices and the composite compressed. Preferably the slices are at least partially frozen, although thawed slices can be employed. Pressure is applied to the outside major surfaces of the slices to distribute the filler between the slices and remove air to form a unitary mass. The amount of pressure typically employed is between about 5.0 to 15 grams/cm$^2$ (0.08 psi.–0.2 psi.)most preferably about 8 grams/cm$^2$.

The resultant unitary product is then subsequently heated to at least the denaturalization temperature of the binding proteins, typically about 70° C. for a time sufficient to cause firm binding between the filler components themselves and between the filler and the outside slices. The product can then be completely cooked in a continuation of that step or at a subsequent time, for example after freezing and shipping. The heating or cooking can be done by a variety of methods including steaming, microwave heating or conventional oven roasting. Most preferably the heat binding step is conducted before the unitary product is frozen. Since if the product is frozen first the subsequent binding power of the components is reduced. Nevertheless, especially where rapid cryogenic freezing is employed, the compressed unitary product can if desired be first frozen before cooking.

When freezing the composite for shipping preferably cryogenic freezing is employed and the product packed into a nitrogen-flushed, or vacuumized high-barrier freezer bags to prevent freezer burn and lipid oxidation during frozen storage.

It is highly preferred that the filler meat when it comprises other than poultry white meat be at least partially decolorized by a decolorizing washing process. This is true for either the MDPM portion of the filler or the ground poultry meat portion of the filler.

A particularly useful washing procedure comprised was the comminuted poultry meat with a phosphate buffer solution, followed by water washing, if desired adding a buffer slurry centrifugation step (see FIG. 1). The buffer solution comprises a dilute aqueous solution of a food grade phosphate, for example mono or disodium or potassium phosphate or mixtures thereof having a pH of between 6.8 and about 8.5, preferably alkaline between about 7.8 and about 8.2. It has been discovered that relatively small amounts of buffer solution are adequate to remove a majority of the removable color. Thus, it has been discovered that the weight ratio of buffer solution to comminuted meat a color removing ration which can be about 3:1 or less for example 2.1 or even 1.5:1. The buffer is mixed with the comminuted meat and allowed to stay in contact with it for a time sufficient to extract a significant portion of the heme pigments from the meat. Subsequent water washes, preferably two, provide a comminuted poultry meat with substantial reduced red or dark color. In addition, the decolorization step which also removes fats provides a comminuted meat with increased binding capacity, apparently at least in part because comminuted meat with reduced fat binds better.

EXAMPLES

A. Ingredients and Reagents

Characteristics of Raw Materials - Three different kinds of mechanically deboned turkey meat (MDTM) were studied: (a) meat from necks without skin (MDTM-necks); b) meat from the whole racks without skin (MDTM-racks), and c) meat from breast frames without skin (MDTM-frames). These meats came from 24-week old carcasses. The mechanical deboning process was carried out at the plant using a Beehive deboner (model AV-1272) at 2° C. and with a screen size of 0.5 millimeter diameter. Deboned meat was frozen and stored at −20° C. until use. Thawing of samples was done at 3° C. for 48 hours.

For only the first sensory evaluation analysis the meat came from skinless necks of broilers processed using a Yieldmaster deboner. The mechanically deboned broiler meat (MDBM) was frozen and stored at −20° C. Meat was received frozen and handled in the same way as the turkey samples.

Chemicals and Ingredients—Phosphates buffers were prepared using monobasic sodium phosphate (NaH$_2$PO$_4$.H$_2$O) and dibasic sodium phosphate anhydrous (Na$_2$HPO$_4$) of analytical grade from Mallinckrodt. The different meat formulations prepared in this study had one or more of the following ingredients: food grade sodium tripolyphosphate (Na$_5$P$_3$O$_{10}$) (TPP) from FMC corporation; pure corn starch ARGO from Best Foods; sodium chloride from International Salt Co.; bread crumbs from Griffith and D-sorbitol S—1876 (D-glucitol) anhydrous from Sigma Chemical Co.

Buffer Preparation - The buffer used for removing the heme pigments out from the meat tissue was the 0.04M phosphate buffer of a pH of 8.0. This buffer was prepared by mixing two stock solutions: a) 0.04M solution of monobasic sodium phosphate (5.56 g of $Na_2H$-$PO_4.H_2O$ in 1000 ml water); and b) 0.04M solution of dibasic sodium phosphate anhydrous (5.68 g of Na in 1000 ml of water). Solutions "a" and "b" were mixed in the proportions recommended by Gomori, *Methods In Enzymology*, 1:138-146 (1955) to obtain a pH of 8.0. Fifty three milliliters of solution "a" were combined with 947 ml. of solution "b" diluting with deionized and distilled water to a total volume of 2000 ml. An Orion research microprocessor ionalyzer 901 was utilized to check the pH of the buffer. An Orion research glass electrode Ag/AgCl was used. Solutions of 1 N sodium hydroxide and 1 N hydrochloric acid were used to adjust the pH of the phosphate buffer to a final pH of 8.0. The buffer solution was stored at 3° C. in a stoppered glass container for further use.

B. Proximal Analysis

Moisture Determination—Moisture content determinations were done at 105° C. in accordance with AOAC official method (1984) for air drying. Samples were analyzed in duplicate and results averaged.

Protein Determination—Nitrogen determinations were done in a Labconco Kjeldahl unit (model 673-E—12) and following AOAC official method (1984). All samples were frozen and freezedried prior to analysis. Protein content was calculated as follows:

$$\% \text{ protein} = \frac{\text{cc acid} \times \text{normality} \times 14 \times 6.25 \times 100}{\text{weight of sample in mg}}$$

Samples were analyzed in duplicate and results averaged.

Crude Fat Determination—Crude fat content was determined by using a Labconco Goldfisch fat extractor (model No. 3000) and following official AOAC method (1984). Samples were frozen and freeze-dried prior to analysis. Extraction was performed using cellulose thimbles from Whatman Co. stoppered with fiber glass. Samples were analyzed in duplicates and results averaged.

C. Physical Measurements pH Measurements—Ten grams of meat were mixed with 100 ml of distilled water for 2 minutes. The mixture was poured into a beaker and the pH of the meat slurry measured with an Orion research microprocessor ionalyzer (model 901).

Expressible Moisture—Expressible moisture was measured using the method developed by Jauregui et al., *J. Food Sci*, 46: 1271-1273 (1980). Three pieces of filter paper Whatman No. 3, 5.5 centimeters in diameter; and, one piece of filter paper Whatman No. 50, 7 centimeters in diameter, were folded into a thimble shape. Filter paper No. 50 remained as the internal surface of the thimble. The filter papers were weighted in a Mettler H20T analytical balance, and 1-1.5 grams of cooked meat samples were added. The meat sample was wrapped inside the filter papers and pushed inside of a 50 ml. polycarbonate centrifuge tube. Samples were centrifuged in a refrigerated centrifuge (Sorvall RC2-B; SS34 rotor) at 16,000 rpm for 15 minutes at 2° C. Filter papers and meat sample were removed from the tubes with tweezers. The meat "cake" remaining in the filter papers was carefully and completely removed. The filter papers were immediately reweighted. Samples were run in triplicates reporting the expressible moisture as percent weight loss from the original sample.

Color Measurements—Color measurements were carried out in a Hunterlab Digital Color Difference Meter D25-2A. Calibration of the machine was first made using a calibrated white C2-6454 tile and standardizing secondly to a calibrated pink C2-6454 tile. Samples were allowed to stabilize to room temperature (20° C.) and mixed for uniformity prior to the readings. Color readings were measured from the bottom of a Pyrex petri dish. Two different readings were performed to each sample. The second reading was done after rotating the same sample 90° from the first reading. In each reading lightness (L), and, chromaticity dimensions (a and b) were recorded.

Texture Measurements—Texture measurements on samples were carried out in a Kramer Shear Press (model S2HE) from Allo Precision Metals Engineer NG Inc. Samples were cut in standard parallelepipeds of approximately $1 \times 1 \times 6$ cm. Once stabilized at room temperature, 70 grams of these parallelepipeds were weighted (Brain Weight Balance B1500 from Ohaus), and set perpendicular to the slots inside the stationary rectangular box of the Kramer Shear Press. The box was closed and set in place. The moving probe composed of 10 bars of 0.114 inches thick was driven through the sample at a speed of 0.65 cm/seg. A sensitive force transducer of 300 pounds was used. Shearing peak values were recorded in a Digital Texturgage TG4B from Food Technology Corporation. All samples were run in triplicates and results averaged.

D. Proximate Analysis Of Samples

The characteristics of the different mechanically deboned turkey meats (MDTM) used in this study were defined by color measurements and a proximate analysis. The proximate analysis for MDTM samples consisted of measuring proteins, fat, and moisture levels, while color was determined by the use of a Hunter colorimeter.

The results obtained from color measurements and proximal analysis for the different uncooked MDTM tested are displayed in Tables 1 and 2. These results include the characteristics of raw ground turkey breast muscle which was used as a control. Results made evident that difference in color among the mechanically deboned samples varied according to the parts of the carcass used in production (see Table 1). Skinless neck meat was the darkest in color with the average values in lightness being ten units below the control. Moreover, meat from necks exhibited the highest values in redness, ranging from +11.07 to +14.63; while breast muscle displayed "a" values ranging from +6.17 to +10.25. On the average the yellow values were the same for all the mechanically deboned samples; however, their values were lower than the control.

Total color differences (TCD) are expressed by the Hunter-Scofield equation as: $\Sigma\Delta = [(\Delta L)^2 + (\Delta a)^2 + (\Delta b)^2]^{\frac{1}{2}}$.

TABLE 1

Color characteristics of the three different kinds of mechanically deboned turkey meat and ground turkey breast meat utilized in this study (uncooked).

| Sample types | L* | a** | b*** | Total Color**** Difference |
|---|---|---|---|---|
| MDTM-necks | 40.69 ± 1.38 | + 12.85 ± 1.78 | + 11.76 ± 1.90 | 10.49 |
| MDTM-breast frames | 44.57 ± 0.20 | + 10.15 ± 0.05 | + 10.57 ± 0.05 | 6.35 |
| MDTM-whole rack | 47.22 ± 0.26 | + 9.37 ± 0.72 | + 11.77 ± 0.09 | 3.34 |
| Ground Turkey Breast (control) | 50.01 ± 1.60 | + 8.21 ± 2.04 | + 13.21 ± 0.60 | — |

*Lightness, higher values - lighter
**Redness when plus
***Yellowness when plus
****Total Color Difference: $\Delta\Sigma = [(\Delta L)^2 + (\Delta a)^2 + (\Delta b)^2]^{\frac{1}{2}}$. $\Delta L$, $\Delta a$, and $\Delta b$ values are differences between Hunter values for the mechanically deboned meat in the study and the control.

(Francis et al, Food Color, metry. Theory and Applns., AVI Pub Co., Westport, Conn. 1975). The $\Delta L$, $\Delta a$, and $\Delta b$ values are differences when comparing Hunter values of the mechanically deboned meat under study with the control-ground turkey breast. TCD was highest in value for meat from skinless necks yielding 10.49; followed by the meat from breast frames with 6.35. The lowest TCD value was obtained from the meat of the whole carcass (3.34). Little, *Food Tech.*, 30:74–82 (1976) reported that TCD is limited in usefulness because it is only an indicator of magnitude of the total difference in color with no directional or dimensional information. However, it was noted from the TCD values that mechanically deboned turkey meat definitely changed color according to the type of meat employed in the deboning process.

Proximate analyses illustrated that the content of fat, protein and moisture varied widely among different types of uncooked mechanically deboned turkey meat (see Table 2). Similar findings have been reported by Froning et al., *Poultry Sci.*, 50: 1206, (1971); Essary, *J. Food Sci.*, 44:1070–1073, (1979); and Hamm et al., *Poultry Sci.*, 62:1810–1815, (1983). The data obtained in proximal composition for MDTM from skinless necks and breast frames were comparable to those reported in the studies noted above. However, the MDTM under study which was recovered from whole racks had a higher fat content due to the fact that during the deboning process, extra skin was added. The level of fat in the raw material going into the deboning process influenced the amounts of moisture and protein in the final paste. As fat increased in the samples, the values of moisture and protein content decreased. These results were supported by Saterlee et al., *J. Food Sci.*, 36:979–981, (1971); and Froning et al., *Poultry Sci.*, 52:923–926, (1973), who mentioned that the addition of skin prior to deboning significantly affected the overall composition of the product. Ground turkey breast had the highest level of protein (22.45%) with a moisture content of 73.07%.

A correlation was found between the fat content and the color of the samples of mechanically deboned meat. As the fat level in the samples increased, lightness (L) values rose; while at the same time "a" values decreased (less redness). As mentioned previously it was observed that MDTM from skinless necks had the darkest color of all the samples. Moreover, it was also found to have the lowest fat content (8.03%). MDTM from breast frames had intermediate color values (lightness and redness) and a fat content of 10.2%. The lightest sample of all the deboned meat used in this study was that collected from whole racks. This sample had the lowest value for redness and the highest fat content (22.22%).

TABLE 2

| Sample Types | Fat Content (%) | Protein Content (%) | Moisture Content (%) | Total Components (%) |
|---|---|---|---|---|
| MDTM-necks | 8.03 | 15.83 | 76.04 | 99.9 |
| MDTM-breast frames | 10.2 | 14.97 | 75.42 | 100.59 |
| MDTM-whole racks | 22.22 | 10.15 | 65.8 | 98.17 |
| Ground Turkey Breast (Control) | 3.99 | 22.45 | 73.07 | 99.51 |

Overall, the control sample consisting of skinless ground turkey breast, displayed the highest values in lightness and yellowness and the lowest values in redness when raw. These results were expected, since poultry breast meat has a low content of myoglobin in its tissue (Forrest et al., *Principles of Meat Sci.*, W.H. Freeman and Co. 1975). Furthermore, by removing the skin from the meat prior to grinding, the breast tissue had a very low fat content, only 3.99%.

E. Pigment Removal

In order to improve color characteristics in MDPM, (increase its lightness and decrease its redness), several water washings were applied to the MDPM to achieve the maximum removal of heme pigments in mechanically deboned poultry meat, the inclusion of a washing step with 0.04M phosphate buffer (Warris, *J. Food Tech.*, 14:75–80,1979) combined with the water washings applied in the surimi and kamaboko processing (Suzuki, "Fish & Kill Protein: Processing Technology", applied Sci Pub. Ltd, London, 1981) accomplished this objective. A diagram of the general process is shown below.

Raw MDPM
First Wash
Squeeze excess liquid
Second Wash
Squeeze excess liquid
Third Wash
Squeeze excess liquid to obtain a meat paste with 75% moisture content In all the washing steps, mechanically deboned poultry meat (MDPM) was mixed with cold water (3° C.) in a weight proportion of 1:5. The mixture was stirred for three minutes with a spoon followed for five minutes rest at room temperature. The blend was filtered using a triple layer of cheese cloth squeezing by hand to remove as much as possible the excess water. At the last washing the meat paste obtained was squeezed to obtain a final moisture content of approximately 75%. Washed meat was stored for 24 hours at 3° C. prior to analysis.

Effect of Water and Buffer Washings on Color—For evaluating the effect of 0.04M phosphate buffer in the extraction of heme pigments (Warris, 1979, Supra), a washing step with 0.04M phosphate buffer was added to the process. Four different phosphate buffers of pH 6.4, 6.8, 7.2 and 8.0 were prepared following the method recommended by Gomori, Supra (1955).

After a first wash with cold water the MDTM-necks were mixed in a weight proportion of 1:4 with cold 0.04M phosphate buffer of pH (6.4, 6.8, 7.2 or 8.0) at 3° C. The mixture was stirred for three minutes and then allowed to rest for forty five minutes at 3° C. After filtering in a triple layer of cheese cloth and squeezing the buffer out, the meat was washed two more times with cold water. Samples were stored at 3° C. for 24 hours prior to readings in the Hunter colorimeter, see Table 3(B).

Effect of Washing Variations—Changes in buffer and water washings were studied to identify their effect on the color characteristics of the final product (see Table 3). The changes in washing procedures were examined as follows:

Buffer Washing—The volume of buffer solution utilized for washing the MDPM was reduced from 4:1 to 2:1 to determine its effect on pigment extraction. MDPM from necks obtained from the first water wash was mixed with cold 0.04M phosphate buffer of a pH of 8.0 (3° C.) in a ratio of 1:2. The mixture was stirred for three minutes with a spoon and allowed to rest for forty five minutes at 3° C. A second and third water washings proceeded the buffer wash, se Table 3(C).

Water Washing—The first water washing was discared to observe its effect in pigment extraction. Thawed MDTM from necks was mixed with cold 0.04M phosphate buffer of a pH of 8.0 (3° C.) in a ratio of 1:2. The blend was stirred for five minutes and allowed to rest for one hour at 3° C. Two cold water washings followed the buffer wash. An increase of two minutes in stirring time and 15 minutes in resting time during the buffer wash were included to favor pigment removal from the tissue, see Table 3(D).

Effects of Water and Buffer Washings on Color—Several experiments were designed to develop a method for decoloring MDPM. Water and different phosphate buffer washings were tested to evaluate their color extracting potential. Based on studies of various authors—Watson (1935); DeDuve, *Biochem, J.,* 29: 2114–2120 (1948); Hornsey *J. Sci. Food & Agri.,* 7:534–540 (1956); Reynfarje *J. Lab. & Clin. Med.,* 61:138–145 (1963); and Warris *Anal. Biochem.,* 72:104–112; *J. Food Tech,* 14:75–80 (1976 and 1979); a 0.04M phosphate buffer was selected as the most effective extracting medium for heme compounds-myoglobin and hemoglobin. MDTM from necks was washed with 0.04M phosphate buffers of different pH values (6.4, 6.8, 7.8, 8.0) to estimate their ability to remove the color. Buffers with lower pH values than those used above were reported not to extract the pigments completely, this was confirmed by Warris, Supra (1979) who found that only 55% of the total heme compounds were washed away. In this study, MDTM from necks, which displayed the darkest color, was used as a standard to evaluate the performance of the different extracting solutions in the removal of heme pigments. After washing the meat samples, the moisture content was adjusted to 75%. Color readings obtained from the Hunter colorimeter are shown in Table 4.

The application of various water washings to MDTM (necks) slightly improved the color of the samples. Meat became lighter by eight units and increased somewhat in yellowness. These results support previous studies done by Poel, *Am. J. Physiol.,* 156:44 (1949), Wierbicki, et al., *J. Agr & Food Chem.,* 3:244–249 (1955), and Warris, Supra (1979), who had confirmed that water did not completely wash away the pigments. Nevertheless less, the most dramatic effect of water washings was in redness, the "a" value decreased from 2.85 to 6.15, more than a 50% reduction.

TABLE 3

| | Water and phosphate buffer washing variations aimed to remove heme pigments from MDPM | | | |
|---|---|---|---|---|
| Experiments | A | B | C | D |
| Process and Ingredients | Only Water Washings | Water and Buffer Washings | Reduction on Buffer Volume Used | Final Washing Process |
| Meat used | MDTM-necks | MDTM-necks | MDTM-necks | MDTM-necks |
| First Wash | Cold Water (3° C.) meat 1:5 water 3 min mix 5 min rest | Cold Water (3° C.) meat 1:5 water 3 min mix 5 min rest | Cold Water (3° C.) meat 1:5 water 3 min mix 5 min rest | 0.04 M Phosphate Buffer pH 8.0 (3° C.) meat 1:2 Buffer 5 min mix 1 hr rest at 3° C. |
| Second Wash | Water Wash same as above | 0.04 M Phosphate Buffer pH: 6.4, 6.8, 7.2 or 8.0 (3° C.) meat 1:4 Buffer 5 min mix 45 min rest at 3° C. | 0.04 M Phosphate Buffer pH 8.0 (3° C.) meat 1:2 Buffer 5 min mix 45 min rest at 3° C. | Cold Water (3° C.) meat 1:5 water 3 min mix 5 min rest |
| Third Wash | Water wash same as above 3 min mix 5 min rest | Cold Water (3° C.) meat 1:5 water 3 min mix 5 min rest | Cold Water (3° C.) meat 1:5 water | Water Wash Same as above |
| Fourth Wash | No | Water wash same as above | Water wash same as above | No |

TABLE 4

Color characteristics of raw MDTM from necks obtained - without treatment, with 3 water washes, and with 3 water washes and an additional was with 0.04 M phosphate buffer having a pH value of either 6.4, 6.8, 7.2 or 8.0

| Sample-MDTM (neck) | L | a | b | a/b(1) | Saturation(2) | Hue(3) | Total Color Difference(4) |
|---|---|---|---|---|---|---|---|
| Without treatment | 40.69 | + 12.85 | + 11.76 | 1.09 | 17.41 | 42.46 | — |
| Water washed | 48.3 | + 6.15 | + 13.20 | 0.46 | 14.56 | 65.02 | 10.24 |
| Water and buffer (pH 6.4 washed) | 47.5 | + 5.90 | + 13.70 | 0.43 | 14.91 | 66.7 | 9.92 |

TABLE 4-continued

Color characteristics of raw MDTM from necks obtained - without treatment, with 3 water washes, and with 3 water washes and an additional was with 0.04 M phosphate buffer having a pH value of either 6.4, 6.8, 7.2 or 8.0

| Sample-MDTM (neck) | L | | a | | b | a/b(1) | Saturation(2) | Hue(3) | Total Color Difference(4) |
|---|---|---|---|---|---|---|---|---|---|
| Water and buffer (pH 6.8 washed) | 51.55 | + | 5.20 | + | 14.15 | 0.36 | 15.07 | 69.82 | 13.49 |
| Water and buffer (pH 7.2 washed) washed) | 51.95 | + | 4.85 | + | 13.90 | 0.34 | 14.72 | 70.76 | 13.98 |
| Water and buffer (pH 8.0 washed) | 61.5 | + | 4.60 | + | 14.85 | 0.31 | 15.55 | 72.78 | 22.6 |

(1) Calculated from individual "a" and "b" observations.
(2) Saturation is expressed by the equation $(a^2 + b^2)^{\frac{1}{2}}$ and is proportional to the strength of color.
(3) Angle whose inverse tangent is b/a.
(4) Total Color Difference: $\Delta\Sigma - [(\Delta L)^2 + (\Delta a)^2 + (\Delta b)^2]^{\frac{1}{2}}$ $\Delta L$ $\Delta a$ and $\Delta b$ values are differences between Hunter values of the washed samples and those from samples with no treatment.

When a washing step with a 0.04M phosphate buffer was administered, the final paste had better color characteristics, i.e., in lightness, yellowness and redness. As the pH of the phosphate solution rose, the values of lightness (L) increased and redness decreased, while "b" results remained mostly consistent for all the different buffers. The buffer with a pH of 6.4 exhibited poorer extracting power. Although it gave better results than water in the chromaticity dimensions (a and b) the lightness value was one unit below that obtained with water. The best extracting medium was the phosphate buffer with a pH of 8.0, which gave the following color attributes to the meat paste: lightness 61.5, a red value of +4.6 and yellow value of +14.85. The results of Watson's, supra (1935) and Warris' supra (1976) research indicated that alkaline phosphate buffers fully extracted the pigment. Moreover, Warris reported that 0.04M phosphate buffers of a 6.8 pH and above, completely recovered any extra hemoglobin and myoglobin added to the meat extracts.

Another aspect of color evaluation is a/b ratios also shown in Table 4. The a/b ratios illustrate the color change in meat as a function of the different washing media. These ratios decreased significantly from the original ratio of 1.09 found in the unwashed MDTM (necks) sample to that observed in the water-washed sample (0.46). There was a steady decrease in the ratios (from 0.43 to 0.31) as the pH of the phosphate buffer rose. This was an expected result due to the increasing pH of the washing solutions, which caused a decline in redness, and conversely, an improvement in yellowness.

Also shown in Table 4 ar color saturation values. Saturation $(a^2+b^2)^{\frac{1}{2}}$, is proportional to the strength of the color or the excitation purity of the samples. There was a significant decrease in the saturation values of the various kinds of washed samples over that of the unwashed sample. This indicated that the purity of color decreased with the washing procedures. A possible explanation for these saturation values obtained is that samples having a dominant color, in this case red; would achieve a higher saturation value than those with a more homogeneous color balance. The Hunter colorimeter was calibrated to a while tile first, and secondly standardized to a pink tile. It has been shown that when specimens are all similar in color, long-term accuracy is greatly increased by having the Hunter colorimeter calibrated to a tile as close in color as that of the specimens to be measured (Mackinney, Color of Foods, AVI Pub Co., Westport, Conn. 1962).

Another variable is hue, and is the attribute by which a color is defined (red, yellow, orange, green blue or violet). Hue is expressed by the angle whose inverse tangent is b/a. In this experiment hue values rose significantly with the water washing process. There was a steady increase in hue as the pH of the buffer became higher. Hue values followed the same pattern as the "L" and "b" values, when the red color was washed away, samples decreased in darkness and other hues tended to predominate in spite of the saturation values which remained steady for all the samples. Hunter, Phys:CS of Color, Hunter Assoc, Lab. Inc. (1972) explained that a tint of hue has a low saturation level, whereas pure color (high hue) has a high one.

Finally, total color difference (TCD) values increased with all the washing procedures. The mean color value obtained from the unwashed MDTM (necks) sample was used as a reference for all the other samples. TCD values, which have no units or direction, are indicators of the magnitude of the total difference in color. The results in this study indicated that the washing process definitely changed the color of the raw pastes. These differences increased in magnitude as the pH of the buffer solutions rose.

The average yields for the washed pastes were 74.5% for the sample washed three times with cold water and 61.6% for those washed with different buffers. The lower average yield in those samples washed with buffer solutions was due to an additional washing step and the higher removal of heme pigments.

Studies on the Effect of Various Types of Washings—Results from the experiment previously discussed made evident that a 0.04M phosphate buffer with a pH of 8.0 was able to remove most of the red pigment from mechanically deboned turkey meat. Therefore, this buffer was selected as the most suitable extracting medium for heme pigments as a standard solution to decolor meat in the succeeding experiments.

In order to establish a standard method for extracting the red color from MDPM, several variations on the washing process were tested. The first process reduced the volume of the buffer solution used in washing the meat. From a volume ratio of 1:4 (meat:buffer) the volume was decreased to a 1:2 ratio. In a second attempt, the first water washing applied prior to the buffer solution was eliminated leaving the final process to one buffer washing and two subsequent water washings.

Reduction in Volume of Buffer Applied in Washing—It was observed that a reduced volume in buffer solution did not affect the color extraction drastically. Results of the washing processes carried out at a 1:4

(meat:buffer) ratio and a ratio of 1:2 are shown in Table 5. On average, lightness and yellowness values were the same for both kinds of treatments but redness was slightly higher (1.3 units) in samples washed with a 1:2 (meat:buffer) ratio. Between the two samples, the value of the total color difference was only 1.32. This was not a great difference considering the fact that the volume of buffer was reduced by 50%. The results once more substantiated the theory that this specific buffer wa the most efficient in extracting myoglobin, hemoglobin and remaining heme pigments. Warris, Supra (1979) emphasized that pigment was equally distributed between the supernatant and the liquid phase of the residue. Therefore, a single extraction under the stated conditions was sufficient to extract all soluble pigments.

MDTM. This method was applied in all subsequent experiments. Therefore, whenever the term "washed-(type of Mechanically Deboned Meat)" is used, it refers to the final paste obtained after the product has been through the following:

MDPM p1 Buffer Wash
1:2 (Meat:buffer), 3° C.

Mix (5 min)

Rest
(1 hour, 3° C.)

Buffer removal by squeezing

TABLE 5

Color differences in raw MDTM (necks) after being washed with a 0.04 M phosphate buffer of pH 8.0 at two different meat:buffer volume ratios.

| Sample MDTM (necks) | L | a | b | TCD* |
|---|---|---|---|---|
| Washed with buffer 1:4 (meat:buffer) ratio | 61.15 ± .49 | +3.54 ± 0.76 | +14.70 ± 0.19 | |
| Washed with buffer 1:2 (meat:buffer) ratio | 61.10 ± 2.54 | +4.89 ± 1.38 | +14.86 ± 0.25 | 1.32 |

*Total Color Difference: $\Delta L$, $\Delta a$, and $\Delta b$ values are differences between Hunter values of the two samples.

Reduction in the Water Washing Steps—As previously mentioned, the mechanical deboning process drastically reduces the particle size of the meat tissue. Furthermore, the reduction in particle size positively and negatively influenced the effectiveness that the washing process had on the finished products. The favorable aspect was that a smaller particle size helped to more easily remove the pigment due to the increased surface area and exposure of reactive groups. On the other hand, adverse effects involved the lost of some of the smaller sized particles that passed through the cheese cloth during the washing process. Particle size was so drastically reduced in the samples that even when using a polyester mesh of 200 meshes per inch (Henry Simon Co.), they still passed through. In order to avoid high losses of meat tissue and a subsequent lower yield, the water washing steps were reduced from three to two. The first water washing was abandoned and then its effect on the color of the samples was evaluated. Results are displayed in Table 6.

1:5 (meat:water), 3° C.

Mix (3 min)—Rest (5 min)

Water removal by squeezing

2nd Water Wash
(same as above)

Water removal by squeezing
(to the desired moisture content)

The average color readings for the raw and boiled samples of washed and unwashed MDTM from necks, as well as for the control, ground turkey breast, are presented in Table 7. This table illustrates that even though the washing process gave the raw MDTM-necks higher "L" values and lower "a" values than the control, once they were cooked, opposite results were

TABLE 6

Color differences in MDTM-necks after being washed with a 0.04 M phosphate buffer having a pH of 8.0 at two different meat:buffer volume ratios. The sample washed at 1:2 ratio also had first water wash

| Sample | L | a | b | TCD* |
|---|---|---|---|---|
| MDTM-necks washed in 1:4 (meat:buffer) ratio | 61.15 ± 1.49 | +3.54 ± 0.76 | +14.70 ± 0.19 | — |
| MDTM-necks washed in 1:2 (meat:buffer) ratio discarding the first water wash | 59.44 ± 2.25 | +6.29 ± 1.49 | +14.26 ± 0.45 | 3.26 |

*Total Color difference: $\Delta L$, $\Delta a$, and $\Delta b$ values are the difference between Hunter readings of the two samples.

The reduction in the water washing steps brought some changes in color. Lightness values decreased by 1.7 units compared to the values obtained with the first process used. On the other hand, "a" values increased by 2.7 units on the red side, while "b" values kept steady scores. Thus, the total color difference was not a big difference considering the fact that it involved not only the reduction of washing steps, but also the reduction in the volume of buffer used. The chart below exhibits the final method adopted for removing the color in observed. In the cooked samples, MDTM (necks) were six units lower in lightness and approximately three units higher in redness than those values for the breast meat (control). These changes in color during the cooking step were attributed to the denaturation of myoglobin to metmyoglobin which caused the subsequent color change from red to brown. In addition, the higher content of connective tissue in white fibers (Cassens and Cooper, *Advances in Food Res.*, 19:2–73, 1971) helped to increase the lightness of the cooked breast. Another possible variable playing a role in color differences could be due to the sarcoplasmic proteins that were removed from the tissue with the washing process. While unwashed raw MDTM (necks) increased in lightness by six units after cooking, the washed version rose in lightness by only one unit. In addition, sarcoplasmic proteins in rabbit meat were reported to be 52 mg/g of white muscle, and 23 mg/g of red muscle (Cassens and Cooper, Supra 1971).

TABLE 7

Color characteristics of raw and cooked samples of ground turkey breast and washed and unwashed MDTM from necks.

| SAMPLE | L | a | b |
|---|---|---|---|
| Raw unwashed MDTM-necks | 40.69 ± 1.38 | +12.85 ± 1.78 | +11.76 ± 1.90 |
| Raw washed MDTM-necks | 59.44 ± 2.25 | +6.29 ± 1.49 | +14.26 ± 0.45 |
| Raw ground turkey breast | 50.01 ± 1.60 | +8.21 ± 2.04 | +13.21 ± 0.60 |
| Cooked unwashed MDTM-necks | 46.30 | +4.2 | +12.45 |
| Cooked washed MDTM-necks | 60.58 ± 2.05 | +3.87 ± 1.07 | +14.83 ± 0.22 |
| Cooked ground turkey breast | 66.50 ± 1.8 | +0.66 ± 0.20 | +14.31 ± 0.33 |

The washing procedures reduced the protein and fat content of MDTM from necks. The protein content was reduced from 15.8% to 11.17%; while the fat level decreased from 8.03% to 4.23% wet basis. The loss in the amount of protein was due to the removal of the sarcoplasmic and heme proteins that are water soluble. Since fat has a lower density than that of water, part of the fat was lost during the washings because of the steps involved in the process itself.

F. Recovery of Precipitate From Buffer Slurry

Particle size of mechanically deboned poultry meat is dramatically decreased by the deboning process. During the washings, part of the meat particles passed through the triple layer of cheese cloth and were lost. Most of the meat particles escaped during the first washing, that is, the buffer washing. For that reason, slurries obtained from the buffer washing were saved and centrifuged in 250 ml. plastic bottles in an automatic refrigerated machine Sorval (RC2-B; GSA rotor). Slurries were centrifuged for 15 minutes at 4000 rpm at 2° C. After centrifugation, the supernatant was discarded and the precipitate washed in the same bottle by addition of cold water (3° C.) with three minutes agitation. Samples were centrifuged under same conditions once more. The supernatant was again discarded while the precipitate saved and stored in a closed container at 3° C. for less than 12 hours. Precipitate was added back to the washed MDPM.

Recovery of Precipitate From Buffer Slurry—The proximal composition of the precipitate recovered from the buffer slurry is displayed in Table 8. The precipitate had the appearance of a very fine wet powder. Its moisture content was very high, since no further squeezing was possible. The precipitate had a low fat level because most of the fat was discarded with the supernatant during the first and second centrifuging. But, the protein content, in contrast, was very high and compared well with the level of protein present in the washed tissue.

TABLE 8

The proximal composition of the precipitate obtained from buffer slurry (wet basis).

| Moisture Content (%) | Fat Content (%) | Protein Content (%) |
|---|---|---|
| 81.3 | 5.7 | 13.7 |

The color of the precipitate showed lighter characteristics than the washed tissue, as well as lower values for redness. Readings from the Hunter colorimeter were 68.8 for lightness, +2.85 for the "a" value, and +12.8 for the "b" value. The "b" value or yellowness was lower than that obtained for the washed meat. Francis et al. Supra (1975) noted that as particle size decreased, the light had more opportunity to be reflected off the particle surface, and thus reflectance increased tremendously. Furthermore, the light path through these particles was so small that the pigments could not impose selective absorption on the light. This resulted in a net increase in lightness.

During the washing process (one buffer wash and two water washings) 35 to 40% of the MDPM washed was lost. The centrifugation of the buffer slurry recovered 7.5 to 8.0% of the total meat lost as a precipitate. Therefore, after adding the recovered precipitate to the washed MDPM, its yield increased in value. The new yield based on the starting material ranged from 67.5 to 73.0% of the total initial paste. A flow diagram incorporating the centrifugation step is shown in FIG. 1.

G. Addition of Turkey Breast Muscle to Patties made with Washed MDTM from Necks

Seven different formulations were prepared using various proportions of washed mechanically deboned turkey necks and ground turkey breast. Chilled breast muscle was ground using a 0.125 inches perforated plate in a Hobart mixer (N—50), the ground meat was received in an ice bath container. Washed mechanically deboned neck meat was mixed with ground breast in a proportion of 0, 20, 30, 50, 70 and 80%; a sample with 100% washed MDTM-necks was also included. Samples were mixed for four minutes in the Hobart mixer at speed 1 adding 1.0% sodium chloride, 3% pure corn starch and 0.5% TPP. After mixing, samples were packaged in polyethylene bags and kept at 3° C. while processing. A circular plastic mold of ten centimeters diameter was used to shape 100-gram patties. Their outside surface was breaded using Griffith bread crumbs. Patties were fried in hot oil (209° C.) for 2.5 minutes on each side, they were allowed to cool over paper towels. Samples were covered with aluminum foil and stored at 3° C. for 24 hours before analysis.

Sensory Evaluation Studies—Two sensory evaluation analyses were carried out. In the first analysis, samples with different proportions and kinds of MDPM were evaluated. Based on the results of the first sensory study the second analysis judged formulations which included different proportions of MDTM-necks combined with ground turkey breast.

Patties Made with MDBM-Necks and MDTM-Frames—Four different formulations were developed for analysis, these samples were as follows: treatment No. 1: 100% mechanically deboned broiler meat from skinless necks (MDBM-necks), treatment No. 2: 75% MDBM-necks and 25% mechanically deboned turkey meat from breast frames (MDTM-frames), treatment No. 3: 50% MDBM-necks and 50% MDTM-frames, and treatment No. 4: 100% ground turkey breast. Formulations were prepared as follows: after washing the MDBM-necks and the MTPM-frames their precipitate was added back and moisture content adjusted to 78%. Samples were made by mixing both meats in the assigned proportions for each treatment in a Hobart (N−50) mixer at speed 1 for four minutes at 3° C. Three percent pure corn starch, 1.2% sodium chloride, and 0.5% TPP were incorporated during mixing. The pastes formed were stuffed in plastic casings (Cryovac) and cooked in hot water (91° C.) to an internal temperature of 80° C.

For forming the patties in treatments 1, 2, and 3, the cooked pastes were shopped into small cubes to give the appearance of muscle pieces. A 75% of the cooked and chopped paste was mixed with 25% of its same raw paste which hold the cooked pieces together. Patties of 100 grams were shaped using a circular plastic mold of ten centimeters diameter. Once the outside surface of the patties was breaded, they were fried in vegetable oil at 155° C. for three minutes on each side. Excess fat was removed with paper towels. Patties were wrapped in aluminum foil and kept at 3° C. before evaluation.

In patties made with 100% ground breast muscle, chilled turkey meat was ground in a 0.125 inches perforated plate of a Hobart mixer (N−50). The ground meat was mixed for 45 seconds incorporating the same ingredients added to the other treatments. The patties were made with a mold then breaded and fried in hot oil (155° C.) for four minutes in each side. After cooking, samples were handled in the same way as in the other treatments.

For sensory evaluation analysis, the patties were heated for 15 minutes at 232° C. in a conventional oven, the samples were cut in four equal pieces and each panelist received about 25 grams of each treatment.

A randomized complete block design experiment was utilized with each panelist representing a block. Five different parameters were evaluated: (a) juiciness, (b) texture, (c) flavor, (d) color, and (e) overall acceptability. Panelists were asked to evaluate the products on a 9 point hedonic scale. The first three parameters were judged using a numerical scale and the last two using a verbal scale. Neutral symbols were utilized to identify the samples.

A panel of 37 people was used, which consisted of graduate students and professors in Food Science. Each panelist was presented with one set of samples containing the four different treatments. Each participant was randomly allocated to one of the twenty four possible tasting orders. Panelists were reminded to rinse their mouths after tasting each sample, and to respect their tasting order. Results were evaluated using Analysis of Variance (ANOVA) and the Least Significant Difference test (LSD) at an alpha level of 0.05 (Snedecor and Cochran, Statistical Methods, Iowa State U. Pres., Ames, Iowa, 1980).

Patties Made with MDTM-Necks and Ground Turkey Breast—Four different formulations were tested: treatment No. 5: 80% MDTM-necks and 20% ground turkey breast; treatment No. 6: 50% MDTM-necks and 50% ground turkey breast: treatment No. 7: 20% MDTM-necks and 80% ground turkey breast; treatment No. 8: 100% ground turkey breast.

The treatments were prepared by mixing both kinds of meat in the assigned proportions. Before mixing the MDTM-neck was washed and combined with its precipitate while the breast muscle was ground in a 0.125 inches diameter perforated plate using a Hobart mixer (N−50). The mixing step was done for four minutes at speed 1 in a Hobart mixer at 3° C. One percent sodium chloride, three percent pure corn starch and 0.5% TPP were added to each treatment adjusting their final moisture content to 75% by addition of cold water. The pastes prepared were kept at 3° C. Patties of 100 g were formed with the raw pastes using a circular plastic mold. Once breaded, patties were fried in hot vegetable oil at 209° C. for 2.5 minutes on each side. Excess oil was removed with a paper towel. Cooled patties were kept at 3° C.

A randomized complete block design experiment was utilized with each panelist representing a block. Six different parameters were evaluated: (a) juiciness, (b) texture, (c) flavor, (d) overall acceptability, (e) color, and (f) color preference. Panelists were asked to judge the first four parameters in a randomly assigned set of samples under dim light conditions. Color and color preference were evaluated under day light conditions in the same set of samples for all panelists. The same participants used in the first sensory study judged the samples in the second taste panel. The same procedures and analyses used in the first sensory panel were applied to this second study.

Addition of Turkey Breast Muscle to Patties Made with Washed MDTM from Necks—The addition of different levels of ground turkey breast to patties made with washed MDTM from necks resulted in higher texture values. Results from the Kramer Shear Press are shown in Table 9.

TABLE 9

| Meat Combinations | Moisture Content (%) | Kramer Values (lbf) |
|---|---|---|
| (A) 100% MDTM-necks* | 74 | 282.50 ± 1.88 |
| (B) 80% MDTM-necks 20% GTBM** | 74 | 208.2 ± 4.64 |
| (C) 70% MDTM-necks 30% GTBM | 74 | 229.9 ± 13.29 |
| (D) 50% MDTM-necks 50% GTBM | 73 | 221.3 ± 10.80 |
| (E) 30% MDTM-necks 70% GTBM | 73 | 197.4 ± 3.53 |
| (F) 20% MDTM-necks 80% GTBM | 71 | 256.7 ± 17.42 |
| (G) 100% GTBM | 70 | 214.66 ± 1.65 |

*Washed mechanically deboned turkey meat = MDTM.
**Ground turkey breast muscle = GTBM.

Although a higher Kramer shear value was observed with the sample made with 100% MDTM (necks), the addition of ground turkey breast meat greatly improved the overall characteristics of samples. The patty made with 100% MDTM (necks) presented a rubbery and spongy consistency very similar to a gel or emulsion-type products. The addition of breast meat into the formulations gave the patties an improved texture more closely resembling a muscle-type product. The difference in texture characteristics between the control (100% breast meat patty) and the samples under study got smaller as the percentage of ground breast meat increased in them. All the texture values gathered for samples containing breast meat were close to the value collected for th control, except for the combination of 20% MDTM (necks) and 80% ground turkey breast meat (GTBM), which obtained the highest texture value, 256.7 lbf. Studies made by Lyon et al. *J. Food Sci.*, 43:1524-1527 (1978) indicated that the use of structured protein fiber in combination with mechanically deboned poultry meat made patties more chewy and elastic. However, off-flavors were perceived when the percentage of structured protein fibers went above 15%. Froning *Poultry Sci.*, 49:1625-1631 (1970) achieved some improvement in texture and emulsion stability of mechanically deboned poultry meat when the hand-deboned counterpart was combined with it.

Also shown in Table 9 is the moisture content of the samples. Although the two different kinds of meat were adjusted to 75% moisture content prior to cooking, the moisture content of the samples varied afterwards. As the level of breast meat rose in the patty formulations, the samples had a tendency to lose more water during the cooking process.

Other characteristics which improved with the incorporation of breast meat in the samples were flavor and color. Patties containing breast meat had better flavor characteristics than the sample made solely from MDTM (necks). Breast meat imparted a more delicate chicken or turkey flavor to the product. Samples increased in lightness and decreased in redness as the levels of ground breast rose. In contrast, "b" values remained more or less constant for all the formulations. These results were expected since breast meat is lighter in color than MDTM (necks). Color readings in the Hunter colorimeter are shown in Table 10.

samples. The loss of red color in samples made the saturation values decrease as the level of breast meat in samples rose. On the other hand, hue values, which also are shown in Table 10, increased steadily as the content of breast meat became higher in the patties. Hue values followed the same behavior pattern as the L values; i.e., once the red color was removed, a purer hue was reflected in higher scores. Finally, the overall total color difference among all the samples showed that the inclusion of breast turkey meat in the formulations definitely changed the color of the patties. The total differences in color between the control and other treatments diminished as more breast meat was added to in the samples.

Sensory Evaluation Studies

Patties Made with Mechanically Deboned Broiler Meat from Necks (MDBM-necks) and Mechanically Deboned Turkey Meat From Breast Frames (MDTM-frames)

In the first sensory evaluation study, four different treatments were analyzed (see Table 11). The parameters tested were: juiciness, texture, flavor, color and overall acceptability. Results of the verbal hedonic scale were converted to numerical values ranging from 1 to 9, with 1 representing the lowest quality of the parameter being evaluated, and 9 representing the highest quality. The data was analyzed by using histograms, residuals, the Analysis of Variance (ANOVA), and the Least Significant Difference Test (LSD).

Juiciness Analysis—The histograms of the data indicated that the three combinations containing mechanically deboned meat were more juicy than the sample made of breast meat. The mean scores for the different treatments were: 6.76 for the 100% MDBM-necks (treatment No. 1); 6.43 for the 75% MDBM-necks and 25% MDTM-frames (treatment No. 2): 6.68 for the 50% MDBM-necks and 50% MDTM-frames (treatment No. 3): and 2.78 for the breast muscle (treatment No. 4) (see Table 12). The mean for the patty made with 100% breast muscle fell below the neutral point of 5, confirming that this patty was the least juicy of the

TABLE 10

Color characteristics of cooked patties made with MDTM from necks and turkey breast meat.

| | Meat Combinations | L | | a | | b | a/b(1) | Saturation(2) | Hue(3) | TCD |
|---|---|---|---|---|---|---|---|---|---|---|
| (A) | 100% MDTM-necks | 57.05 | + | 1.15 | + | 14.30 | 0.08 | 14.35 | 85.40 | 11.77 |
| (B) | 80% MDTM-necks 20% GTBM | 61.25 | + | 0.85 | + | 14.35 | 0.06 | 14.37 | 86.61 | 7.57 |
| (C) | 70% MDTM-necks 30% GTBM | 62.40 | + | 0.70 | + | 14.40 | 0.05 | 14.41 | 87.22 | 6.42 |
| (D) | 50% MDTM-necks 50% GTBM | 64.85 | + | 0.75 | + | 14.30 | 0.05 | 14.32 | 86.99 | 3.97 |
| (E) | 30% MDTM-necks 70% GTBM | 66.80 | + | 0.35 | + | 14.30 | 0.02 | 14.30 | 88.59 | 2.03 |
| (F) | 20% MDTM-necks 80% GTBM | 67.90 | + | 0.30 | + | 13.80 | 0.02 | 13.80 | 88.75 | 0.92 |
| (G) | 100% GTBM | 68.80 | + | 0.45 | + | 13.95 | 0.03 | 13.95 | 88.15 | — |

(1) Calculated from individual a and b observations
(2) Saturation is expressed by the equation $(a^2 + b^2)^{\frac{1}{2}}$ and is proportional to the strength of color
(3) Angle whose inverse tangent is b/a
(4) Total Color Difference $\Delta\Sigma = [(\Delta L)^2 + (\Delta a)^2 + (\Delta b)^2]^{\frac{1}{2}}$ $\Delta L$, $\Delta a$, and $\Delta b$ values are differences between Hunter values of the meat combination samples with those from the sample of 100% GTBM.

Also in Table 10 the a/b ratios are recorded. The a/b ratios illustrate the color change in meat as a function of the increase in levels of breast meat in the formulations. These ratios decreased from 0.09 from the 100% MDTM-necks) sample to a ratio of 0.03 obtained for the 100% turkey breast sample. The change in the value of the ratios was mostly due to the lost of red color in the samples. When there is a strong difference of opinion on a parameter, histograms often exhibit a bimodal distribution. However, no such distribution was observed in any product. The difference in opinion for juiciness was higher in treatments 1, 2, and 3. This was verified by the fact that their variances of the raw data were much greater than that observed for treatment No. 4. The marked differences in the variances are statistical indicators of potential differences within treatments.

TABLE 11

Composition of the different treatments tested in the first sensory study.

| Treatment | Composition | Moisture Content* (%) | Fat Content* (%) |
|---|---|---|---|
| 1 | 100% MDBM-necks | 69.80 | 15.13 |
| 2 | 75% MDBM-necks 25% MDTM-frames | 70.80 | 13.73 |
| 3 | 50% MDBM-necks 50% MDTM-frames | 69.70 | 14.32 |
| 4 | 100% Breast Muscle | 63.00 | 3.99 |

*Wet weight

In order to identify whether the differences in juiciness between means were due to the random variation naturally present, or due to actual differences in perception of juiciness between samples, an analysis of variance (ANOVA) was performed.

In order to identify which means were different, a least significant difference (LSD) test was performed on the data (see Table 12). At an alpha level of 0.05, the LSD indicated that there was no significant difference between products 1, 2, and 3; however, the three of them differed in juiciness from the 100% breast muscle patty.

TABLE 12

Results of the LSD test for treatments 1, 2, 3, and 4 in: (a) juiciness, (b) texture, (c) flavor, (d) color, and (e) overall acceptability.

| Sample types | A Juiciness | B Texture | C Flavor | D Color | E O. Accept. |
|---|---|---|---|---|---|
| (1) 100% MDBM (1)-necks | 6.76a | 2.46a | 4.89a | 4.35a | 4.89a |
| (2) 75% MDBM-necks 25% MDTM (2)-frames | 6.43a | 3.14b | 5.86b | 4.70ab | 5.54ab |
| (3) 50% MDBM-necks 50% MDTM-frames | 6.68a | 2.92ab | 5.65b | 4.89b | 5.49ab |
| (4) 100% GTBM (3) | 2.78 | 7.59c | 7.03c | 7.30c | 6.05b |

(1) Washed mechanically deboned broiler meat.
(2) Washed mechanically deboned turkey meat.
(3) Ground turkey breast meat.
a, b, c, - Means (n = 37) having the same letter were not significantly different at an alpha level of 0.05.

These results are in correlation with the actual measurements of moisture content in the cooked patties. Although all the raw materials were adjusted to a moisture content of 78%, the different cooking procedures used gave different final moisture contents. While patties made with mechanically deboned meat were first cooked in hot water, and later formed into a patty and fried, the sample of 100% breast meat was formed into a patty with the raw breast and then fried in hot oil for a longer period of time. The final moisture content of the patties was: 69-70% for all the mechanically deboned meat samples and 63% for that made with breast muscle (see Table 11).

Texture Analysis—The texture analysis of the four treatments were also examined using means, histograms, and ANOVA. The mean scores for texture in treatments 1, 2, 3, and 4 were: 2.46, 3.14, 2.92, and 7.59, respectively. The mean scores for formulations 1, 2, and 3 fell below the neutral point of 5, and panelists commented that these patties were soft, mushy and spongy. On the other hand, the mean score for sample No. 4 (100% breast muscle) was above the neutral point of 5. This sample by far was the toughest according to the mean values.

The histograms showed that the scores given by the panelists were not as spread out as the scores obtained in juiciness. Panelists tended to have the same opinion regarding the texture of the products No. 1, 3, and 4. People found these samples to be either soft or rather tough with few ratings in the middle. For treatment No. 2 the scores were more evenly distributed. These findings were also supported by the variance of the raw data. While the variances of treatments 1, 3, and 4 were very close, the variance of treatment No. 2 was by far the highest.

When the residuals were plotted, it was shown that they were basically distributed normally, confirming the assumption of normality. However, the variances of the residuals affirmed that the assumption of the equality of variances was not met. At an alpha level of 0.05, the ANOVA resulted with an F value of 177.28, which exceeded the critical value of $F^3{}_{108}$ 2.68. Therefore, there was strong statistical evidence to reject the null hypothesis and conclude that a real perceivable difference existed in the texture characteristics of the four treatments.

The LSD (see Table 12) at an alpha level of 0.05 showed no significant difference in texture between treatments 1 and 3, and between treatments 2 and 3. On the other hand, a significant difference in texture was found between products 1 and 2. All the treatments made with mechanically deboned poultry meat were significantly different in texture from the sample made of breast meat.

Texture measurements of the different treatments in the Kramer Shear Press are shown in Table 13. The same texture values were obtained for treatments No. 1 and 3, which were in accordance with the subjective measurements made by the panelists. However, a higher texture value was recorded in the Kramer Shear Press for treatment No. 2. On the contrary, panelists did not perceive any significant difference in texture between treatments No. 2 and 3; nevertheless, they did find a significant difference between treatments 1 and 2. These results suggested that the difference in tenderness between treatments might not be large enough to be clearly noted by all the participants. An increase in panel size or the use of a trained panel might help to overcome this condition. When the rating for the sample made with 100% breast muscle was done, it was found to be the firmest in objective texture measure and even the panelists found this sample to be too tough. The difference in toughness between treatments is understandable since the breast meat from which the patties were made did not go through the same trauma caused by the deboning process (Schnell et al., *Poultry Sci.*, 53:416–419 1974). It could be assumed that in the experiment presently under discussion, that since fibers in the breast meat were longer they could form a stronger network; thus resulting in higher texture measurements.

TABLE 13

Texture measurement of treatments 1, 2, 3, and 4 obtained from the Kramer Shear Press.

| Treatment | Composition | Kramer Shear Press Value (lbf) | Moisture Content (%) |
|---|---|---|---|
| 1 | 100% MDBM-necks | 140.13 | 69.80 |
| 2 | 75% MDBM-necks 25% MDTM-frames | 156.00 | 70.80 |
| 3 | 50% MDBM-necks 50% MDTM-frames | 140.66 | 69.70 |
| 4 | 100% Breast Muscle | 821.60 | 63.00 |

Flavor Analysis—The mean scores for the treatments 1, 2, 3, and 4 were 4.89, 5.6, 5.65, and 7.03, respectively. The mean for treatment 1 fell below the neutral point of 5, while all the other treatments had higher mean values with the sample made with 100% breast muscle being the most accepted.

All the treatments had wide spread scores, which agreed with the variances of the raw data. The rating distribution of treatments 1 and 3 suggested that panelists had an equal attraction for the patties. There was no marked tendency toward any score, giving them a score of either 4, 5, or 6. People preferred treatments 2 and 4, which received higher scores.

A normal plotting of residuals confirmed the assumption of normality; however, the variances of the residuals were not equal. The ANOVA yielded a calculated F value of 12.59 at an alpha level of 0.05. This value exceeded the critical table value of $F^3_{108}$ 2.68. As a consequence the null hypothesis was rejected. It was concluded by the strong statistical evidence that a real perceivable difference in flavor existed between the four treatments.

The LSD analysis (see Table 12) at an alpha level of 0.05 indicated that the sample made of 100% MDBM-necks was significantly different from the rest. On the other hand, there was not significant difference in flavor between the other two mechanically deboned meat combinations. Although the patty made with 100% breast meat was the highest rated, its mean score was not as high as expected because it was very tough, dry, and rubbery. Participants commented that the samples made with mechanically deboned meat were greasier, and some people also found an after-taste in these samples, especially in those made with 100% MDBM-necks. The analysis of fat content in the samples (Table 11) indicated that treatment No. 1 presented the highest fat content with 15.13% followed by treatments 3 and 2. Sample No. 4 had only 3.99% fat.

Color Analysis—The mean scores in color from the different treatments in ascending order were 4.35, 4.70, 4.89, and 7.30, respectively. The means for treatments 1, 2, and 3 fell very close to the neutral point of 5, while the mean for treatment No. 4 was above it. None of the panelists objected to the color of the patties; no negative statements were received for this parameter.

The analysis of the histograms indicated that the scores given by the panelists concentrated around a small range of values. The variances of the raw data were very similar for samples No. 1, 3, and 4. In contrast, the variance of sample No. 2 was higher, and the scores given by the panelists were not concentrated around one value, but rather evenly spread out in a range of different scores.

The normal plotting of residuals showed that the normality assumption was met, but not the assumption of equal variances. The ANOVA is able to overcome this limitation so long as the experiment being conducted uses random sampling in its procedures. Nevertheless, it has to be accepted that the probability of a Type I error will be somewhat greater than the alpha level.

At the alpha level of 0.05, the ANOVA yielded an F value of 56.87 which exceeded the critical table value of $F^3_{108}$ 2.68, thus indicating that there was strong statistical evidence to reject the null hypothesis and conclude that there was a definite noticeable difference in color between the different samples.

The LSD analysis demonstrated that at an alpha level of 0.05, treatments 1 and 2, as well as 2 and 3, were not significantly different. However, there was a significant difference between treatments 1 and 3. Treatment 4 was significantly different from all the rest. Results are shown in Table 12.

The objective measurements of color carried out in the Hunter colorimeter indicated that the lightest sample was the patty made with 100% breast muscle. In samples made with mechanically deboned meat, lightness increased and redness decreased as the content of MDTM-frames rose; this was expected since the meat from the frames was lighter than the meat from necks. Table 14 shows the values taken from the Hunter colorimeter for the different cooked patties. These values supported other results already obtained in the statistical analysis. Panelists scored the lightness of the samples in the same order as the Hunter colorimeter did. However, no significant difference in perception in color was recorded by the panelists when the differences between values of lightness were less than one unit apart on the colorimeter.

TABLE 14

Readings obtained from the Hunter colorimeter for treatments 1, 2, 3, and 4.

| Treatment | L | a | b |
|---|---|---|---|
| 100% MDBM-necks | 56.2 | +2.95 | +14.90 |
| 75% MDBM-necks 25% MDTM-frames | 57.4 | +2.30 | +15.40 |
| 50% MDBM-necks 50% MDTM-frames | 58.1 | +1.65 | +15.00 |
| 100% Breast Muscle | 65.1 | +0.65 | +14.35 |

It is important to point out that the shipment of meat consisting of MDBM-necks that was used in preparing the patties for this sensory analysis had some red spots of coagulated blood. They could not be washed away with the buffer or the water wash which made the final samples decrease in lightness and increase in redness. This problem could have affected the final results since samples obtained with MDTM-necks in previous experiments had given better color results (see Table 15).

TABLE 15

Readings obtained from the Hunter colorimeter for the batch of MDTM-necks used for the first sensory study and for previous batches.

| SAMPLES: SENSORY | L | a | b |
|---|---|---|---|
| MDBM-necks | | | |
| a. Raw | 42.2 | +16.1 | +13.7 |
| b. Cooked (washed) | 57.7 | +10.8 | +15.7 |
| OTHERS MDTM-necks | | | |
| a. Raw | 47.2 | +9.4 | +11.8 |
| b. Cooked | 59.4 | +6.2 | +14.2 |

TABLE 15-continued

Readings obtained from the Hunter colorimeter for the batch of MDTM-necks used for the first sensory study and for previous batches.

| SAMPLES: SENSORY | L | a | b |
|---|---|---|---|
| (washed) | | | |

Overall Acceptability—For treatments 1, 2, 3, and 4, the mean scores were 4.89 5.54, 5.49, and 6.05, respectively. All the mean scores for the treatments were above the neutral point for 5, except for the mean of treatment No. 1. Treatment 4 rated the highest in acceptability by the panelists.

The assumptions for the analysis of variance were met, except for the equality of variances between treatments.

The ANOVA test obtained an F value of 3.15 at an alpha level of 0.05. This value exceeded the critical value of $F^3{}_{108}$ 2.68, causing the null hypothesis to be rejected. The LSD test (see Table 12) performed at the same alpha level determined that there was not a statistically significant difference among treatments 1, 2, and 3 or among treatments 2, 3, and 4. Nevertheless, there was a statistically significant difference between treatments 1 and 4. These results were supported by the outcome from the flavor analysis where the same order in preference was reported. Although the breast muscle patty had the best score in overall acceptability, its toughness and dryness pulled down its grading closer to the mechanically deboned samples. Based on the comments received by the panelists, the texture, flavor, and juiciness of the patty mainly caused its lower rating. Color did not seem to have such an important role in the rating.

Although significant differences were expected between treatments containing mechanically deboned meat and the treatment with 100% breast muscle, the study was aimed at quantifying those differences and finding out the best approach to minimize them. The results for juiciness given by the panel correlated with the objective measurements. The moisture content of all the mechanically deboned meat treatments was higher than the treatment made of breast muscle; 70% and 63%, respectively. The panel did not sense any significant difference among the mechanically deboned meat patties, but they did notice a significant difference between them and the sample made with breast muscle. The difference in moisture content was attributed to the difference in the various cooking procedures (see Table 16).

In addition, measurements with the Kramer Shear Press showed that the sample made with breast meat was by far the toughest. Though, all the patties made with mechanically deboned meat showed smaller values in the Kramer Shear Press (see Table 16). This was due to the fact that the deboning process reduced the particle size to such an extent that the functionality of the muscle fibers was affected (Valdehra and Baker, *Food Tech.*, 24:42 1970). High temperatures during the process could result in lost of protein solubility with a subsequent reduction in the bonding capacity of the proteins (Froning, *Supra* 1970).

In the test for color, the highest scores for lightness were obtained for the breast patty. For the mechanically deboned combinations, however, lightness values rose in correlation to the increase in the amount of the MDTM-frames in the sample. This was expected since the meat from frames was lighter than the meat from necks (see Table 16). Panelists preferred the patty made with breast meat; however, their scores were affected by the dryness and toughness of the patty. Panelists complained about the greasy taste of the other three treatments giving them lower scores. The mean scores in overall acceptability between samples was not remarkably different as those for the other parameters. The study showed that the MDTM-frames had a major effect on color, helping to make the product lighter. MDTM-frames also helped to improve the texture, flavor, and overall acceptability of the samples containing MDBM from necks.

Patties Made with MDTM-necks And Ground Turkey Breast—In a second sensory study, four different formulations were analyzed: treatment No. 5–20% ground turkey breast meat (GTBM) and 80% MDTM-necks; treatment No. 6–50% GTBM and 50% MDTM-necks; treatment No. 7–80% GTBM and 20% MDTM-necks; and treatment No. 8–100% GTBM (see Table 17). Neck meat was utilized in this study because it had the lowest fat content and the darkest color (see Table 1) and represented the most severe test of color removal procedures. Panelists judged six different parameters—juiciness, texture, flavor, overall acceptability, color, and color preference. The first four categories were evaluated in samples placed in a random arrangement under a dim light. The parameters of color and color preference were scored under day light conditions with all panelists analyzing the same specific set of samples. Data was analyzed using the same methods applied for the first sensory study.

TABLE 16

Objective measurements and panelists scores obtained for the various treatments in the first sensory study.

| TREATMENTS | JUICI-NESS | MOISTURE CONTENT (%) | TEX-TURE | KRAMER SHEAR (lbf) | FLAVOR | COLOR | HUNTER COLOR MEASUREMENTS | OVERALL ACCEPTABILITY | FAT CONTENT (%) |
|---|---|---|---|---|---|---|---|---|---|
| (1) 100 % MDBM(1)-necks | 6.76a | 69.80 | 2.46a | 140.13 | 4.89a | 4.35a | 56.20* +2.95** +14.90*** | 4.89a | 15.13 |
| (2) 75% MDBM-necks 25% MDTM(2)-frames | 6.43a | 70.80 | 3.14b | 156.00 | 5.86b | 4.70ab | 57.40 | 5.54ab | 13.73 |
| (3) 50% MDBM-necks 50% MDTM-frames | 6.68a | 69.70 | 2.92ab | 140.66 | 5.65b | 4.89b | 58.10 +1.65 +15.00 | 5.49ab | 14.32 |
| (4) 100% GTBM(3) | 2.78 | 63.00 | 7.59c | 821.60 | 7.03c | 7.30c | 65.10 +0.65 | 6.05b | 3.99 |

TABLE 16-continued

| TREATMENTS | JUICINESS | MOISTURE CONTENT (%) | TEXTURE | KRAMER SHEAR (lbf) | FLAVOR | COLOR | HUNTER COLOR MEASUREMENTS | OVERALL ACCEPTABILITY | FAT CONTENT (%) |
|---|---|---|---|---|---|---|---|---|---|
| | | | | | | | +14.35 | | |

(1) Washed mechanically deboned broiler meat.
(2) Washed mechanically deboned turkey meat.
(3) Ground turkey breast meat.
(4) Wet basis.
a, b, c - Means (n = −37) having the same letter were not significantly different at an alpha level of 0.05.
*Wet basis
***"a" values
***"b" values

TABLE 17

Composition of the different treatments tested in the second sensory study.

| Treatment | Composition | Moisture Content (%) | Fat Content (%) | Expressible Moisture (%) |
|---|---|---|---|---|
| 5 | 20% ground turkey breast 80% MDTM-necks | 74.7 | 7.2 | 65.3 |
| 6 | 50% ground turkey breast 50% MDTM-necks | 71.8 | 6.6 | 68.6 |
| 7 | 80% ground turkey breast 20% MDTM-necks | 71.0 | 6.1 | 65.3 |
| 8 | 100% ground turkey breast | 71.0 | 5.6 | 63.8 |

Juiciness Analysis—The mean scores obtained for the different treatments in juiciness were as follows: treatment No. 5–6.19, treatment No. 6–4.73, treatment No. 7–4.62, and treatment No. 8–4.35. The mean for treatments 6, 7, and 8 were close to the neutral point, which meant that the juiciness of the samples fulfilled the expectations of the panelists. Treatment No. 5 was above the neutral point of 5, confirming that this patty was the juiciest. However, some people complained that its juiciness was somewhat close to oiliness. The study of the histograms for the treatments above mentioned showed that treatment No. 5 had a left skewed distribution. The scores of treatment No. 6 produced a slightly bimodal distribution, while those of treatment No. 7 were in a moderately normal distribution. Treatment No. 8 presented a bimodal distribution the greatest number of values grouped around the scores 4 and 6. Bimodality suggested a sharp difference in opinion among panelists; some people found the patties of treatment No. 8 to be "just juicy", while others rated them as "more juicy" on the hedonic scale. Variances for treatments 5, 7, and 8 demonstrated the strong difference in opinion among the judges, while treatment No. 6 exhibited less variability in its scores.

The normal plotting of residuals showed that the assumption of normality was satisfied; however, the equality of variances was not met. The residuals for treatments 5 and 8 had greater variances than treatments 6 and 7. The ANOVA yielded an F value of 16.32, which exceeded the critical $F_{3108}$ value of 2.68 at an alpha level of 0.05. As a consequence, there was strong statistical evidence to accept that there was a perceivable difference in juiciness among treatments.

The least significant difference test (LSD) was performed to identify which of the treatments was different from the others. At an alpha level of 0.05, the LSD indicated that there was a perceivable difference in juiciness between treatment 5 and treatments 6, 7, and 8, which had no significant difference between them (see Table 18).

The subjective results of the panel can be explained by the composition of the different patties. Table 17 represents some characteristics of the cooked patties. Moisture and fat content were higher for treatment No. 5, resulting in a juicier patty. Although treatments 7 and 8 had the same moisture content, the panelists found treatment 7 juicier than 8. This difference was reflected to some extent in their dissimilar values for expressible moisture. Data illustrated that as the percentage of ground breast muscle increased in the formulations, the content of fat decreased. Despite the fact that panelists found treatment 5 particularly greasy, the amount of fat in the sample was by no means high, only 7.20%. Nevertheless, some of the oil used in frying remained on the breaded surfaces and this could have influenced the evaluation by the panelists.

TABLE 18

Results of the LSD test for treatments 5, 6, 7, and 8 in (a) juiciness, (b) texture, (c) flavor, (d) overall acceptability, (e) color, and (f) color preference.

| % MDTM (1) from necks | A Juiciness | B Texture | C Flavor | D O. Accept. | E Color | F Color Preference |
|---|---|---|---|---|---|---|
| 80 | 6.19a | 3.59 | 5.76a | 5.73a | 4.38a | 5.68a |
| 50 | 4.73a | 5.24a | 6.30ab | 6.19ab | 4.95b | 6.05a |
| 20 | 4.62a | 5.51a | 6.76bc | 6.59bc | 5.95c | 6.81b |
| 0 | 4.35 | 5.16a | 6.97c | 6.95c | 6.59d | 7.32b |

(1) Mechanically deboned turkey meat. Balance was ground breast meat (see Materials and Methods).
a, b, c, d - Means (n = 37) having the same letter were not significantly different at an alpha level of 0.05.

Texture Analysis—The means of the four different treatments tested were 3.59 for treatment No. 5; 5.24 for treatment No. 6; 5.51 for treatment No. 7; and 5.16 for treatment No. 8. The mean of treatments 6, 7, and 8 were above the neutral point of 5 showing that texture was well accepted and, in general, had the proper consistency of a patty-like product. Panelists commented that treatment No. 5, apart from being the softest, had an unappealing rubbery or spongy texture. The inclusion of ground breast meat remarkably improved the scores of panelists, as compared with the first sensory study. Histograms of the data showed that treatment No. 5 had a right skewed distribution while the scores for treatments 6, 7, and 8 were distributed in more symmetrical bell curves. In all the treatments, the scores were spread out in a wide range of values, displaying the difference in opinion within each treatment. However, a concentration in scores was found around the middle point of the scale. Moreover, the variances in the scores given for the four treatments were very close in value.

The normal plotting of residuals confirmed the assumption of normality. The variances of residuals indicated that the assumption of equal variances in all treatments was fairly met the fulfillment of these assumptions made the ANOVA test a powerful statistical tool. The analysis of variance test resulted in an F value of 21.45, which exceeded the $F^3{}_{108}$ critical value of 2.68 at an alpha level of 0.05. Therefore, it was concluded that strong statistical evidence was present to accept the hypothesis that at least one of the means is different.

The LSD test (Table 18), at an alpha level of 0.05 confirmed that there was a real perceivable difference in texture between treatment 5 and treatments 6, 7, and 8; which displayed no significant difference between them.

The average values for each treatment in the Kramer Shear Press are shown in Table 19. Objective measurements were in accordance with the results obtained by the panel. Although it was expected that there would be an increase in shear force with the increase of ground breast to the patty, the combination of 80% breast muscle and 20% MDTM-necks gave the highest value. It was followed by sample No. 6, which consisted of 50% ground breast and 50% MDTM-necks, and then by sample No. 8, having 100% ground breast. These results suggested that the combination of ground breast and MDTM-necks under certain percentages helps to increase the shear values of texture. Treatment No. 5 (80% MDTM-necks and 20% breast) was the softest, and this result was also influenced by its higher moisture and fat content.

TABLE 19

Texture measurements of treatments 5, 6, 7, and 8 obtained from the Kramer shear press.

| Treatment or sample | Kramer Shear (lbf) | Value Moisture Content (%) |
|---|---|---|
| (5) 20% GTBM* 80% MDTM-necks** | 212.5 | 74.7 |
| (6) 50% GTBM 50% MDTM-necks | 290.8 | 71.8 |
| (7) 80% GTBM 20% MDTM-necks | 303.3 | 71.0 |
| (8) 100% GTBM | 280.5 | 71.0 |

*ground turkey breast muscle
**washed mechanically deboned turkey meat

Comparing the above results with the ones recorded in the first sensory study, it was clear that a great improvement in texture values was achieved. There was an increase in shear values of almost 100% for samples containing breast meat in their formulations. From this, it could be concluded that the addition of ground breast muscle to MDTM-necks greatly improved the textural characteristics of the final product. Breast meat gave the MDTM-necks a harder texture and the consistency expected for the muscle-type products. Furthermore, the patty made with 100% breast meat presented more realistic shear values in this second study since the moisture content was adjusted to 75%.

Flavor Analysis—The mean scores for the different treatments were: 5.76 for treatment No. 5; 6.30 for treatment No. 6; 6.76 for treatment No. 7 and; 6.97 for treatment No. 8. All the means were above the neutral point which indicated favorable ratings by the panelists. Treatments 6, 7, and 8 had high mean values very close together. Histograms showed that the panelists did not have a wide difference in opinion: scores tended to concentrate around the various means. Treatment No. 5 had a flat, almost uniform distribution, while treatment No. 6 showed a slightly left skewed distribution, indicating that most panelists tended to give it higher scores. At the same time, histograms of treatments 7 and 8 displayed definite left skewed distributions with a heavy tail. The narrowed distributions in this sensory study contrasted with the wide distributions obtained in the first study. The second study suggested a more homogeneous opinion in the flavor of the samples. The above was supported by the different values in the variances between treatments for the first and the second study. Treatments of the second sensory study yielded lower variances.

The normal plotting of residuals indicated that the assumption of normality was met. The analysis of residuals suggested that variances were not equal since treatment No. 6 presented a smaller random variability. The analysis of variance yielded an F value of 6.35 which exceeded the critical $F^3{}_{108}$ value of 2.68 at an alpha level of 0.05. The null hypothesis was rejected concluding that there was strong statistical evidence to consider a noticeable difference in flavor among the four treatments.

The LSD test (Table 18 (c)) at an alpha level of 0.05 confirmed the difference in treatments. There was a significant difference among treatments 5, 7, and 8, and at the same time, there was a significant difference between treatments 6 and 8. However, no significant difference was found between treatments 7 and 8.

The addition of ground breast meat in the samples greatly improved their flavor characteristics. Even though the 100% breast patty was scored the highest, scores for treatments 6 and 7 were close to it. Panelists commented that treatments 7 and 8 had a strong turkey flavor. In comparing comments from the two sensory studies, there were no complaints of an aftertaste in the samples of the second study.

Overall Acceptability Analysis—The results from the evaluation in overall acceptability gave the following mean scores: 5.73 for treatment No. 5; 6.19 for treatment No. 6; 6.59 for treatment No. 7, and 6.95 for treatment No. 8. All the means of treatments were above the neutral point, indicating that panelists liked the samples. Means in general were very close in value among treatments, suggesting that the panelists perceived few differences between them.

Histograms for the raw data showed that treatment No. 5 had a flat, bell-shaped curve with a tendency towards a uniform distribution. The treatments 6 and 8 showed very slightly left skewed distributions, while treatment No. 7 had a definite left skewed distribution. Panelists did not have a wide difference of opinion for treatments 6, 7 and 8; their scores concentrated around the means. On the other hand, distributions from the first sensory study suggested a wide difference in opinion among panelists. In the first study, three of the treatments presented almost uniform distributions over a wide range of values. This was supported by the higher values obtained in the variances for the treatments 1, 2, 3, and 4. To the contrary, the second study yielded much lower variances for each treatment.

The normal plotting of residuals indicated that the assumption of normality was fulfilled because the residuals had almost the same variances except for treatment No. 5, where more random variation was noted. The ANOVA resulted in an F value of 5.59, which exceeded the $F^3_{108}$ table value of 2.68 at an alpha level of 0.05.

The LSD test for overall acceptability at an alpha level of 0.05 found no perceivable difference between treatment 5 and 6; between treatment 6 and 7, or between treatment 7 and 8. Nevertheless, a perceivable difference was found between treatment 5 and treatments 7 and 8, as well as between treatments 6 and 8. The results suggested that in overall characteristics, the sample with 100% ground breast might be comparable with that of 80% ground breast without the participants observing any noticeable differences. Panelists commented that those samples were the ones they liked the best, although some people found them bland in flavor.

Color Analysis—The mean scores for color for the different treatments were: 4.38 for treatment No. 5; 4.95 for treatment No. 6; 5.95 for treatment No. 7 and 6.59 for treatment No. 8. Lightness was indicated by higher scores. In the samples, lightness values rose as the content of the breast meat increased. Treatment No. 8, which was made of only breast meat, achieved the highest value. Treatments No. 5 and 6 fell below the neutral point, but not by much.

Panelists tended to have the same opinion about the color of the patties. This was reinforced since all the panelists judged the same set of samples. Histograms showed that scores concentrated around the means. Treatment No. 5 had a flat right skewed distribution, treatment No. 6 presented a very slightly bimodal distribution, while treatments No. 7, and 8 showed left skewed distributions. Variances of the raw scores indicated more variability in opinion within treatments 5 and 6. Variances were similar to those obtained in the first study.

Residuals did not present equal variances. Normal plotting of residuals pointed out that the normality assumption was met. The ANOVA was carried out yielding an F value of 39.66 which exceeded the $F^3_{108}$ table value of 2.68 at an alpha level of 0.05. The results indicated that at least one mean for the treatments was different from the others. The LSD test at an alpha level of 0.05 wade evident that there was a perceivable significant difference in color among all the treatments.

Objective measurements in color given by the Hunter colorimeter are shown in Table 20. Although differences in color as measured by the Hunter colorimeter were small among treatments, panelists could pick up those differences. The results of the panel indicated that the differential threshold, or just noticeable difference, in color has to be very small to obtain no significant results between treatments. Patties increased in lightness and yellowness, while decreased in redness as the content of breast meat increased.

Color Preference Analysis—The mean scores for color preference were 5.68 for treatment No. 5, 6.06 for treatment No. 6, 6.81 for treatment No. 7, and 7.32 for treatment No. 8. Panelists tended to prefer lighter samples. Histograms of the data illustrated that panelists had a wider difference in opinion in treatments 5 and 6 than in treatments 7 and 8. distributions for treatments 5 and 6 tended to be flat and left skewed, while those for treatments 7 and 8 were just slightly left skewed with a bell-shaped curve. Higher variances were obtained for treatments 5 and 6.

TABLE 20

Readings obtained from the Hunter colorimeter for treatments 5, 6, 7, 8, and an unwashed MDTM-necks patty.

| Treatment or Sample | L | a | b |
|---|---|---|---|
| (5) 20% GTBM* 80% MDTM-necks** | 58.35 | +1.65 | +13.8 |
| (6) 50% GTBM 50% MDTM-necks | 59.80 | +1.6 | +13.2 |
| (7) 80% GTBM 20% MDTM-necks | 62.20 | +1.35 | +14.05 |
| (8) 100% GTBM | 65.60 | +0.9 | +14.65 |
| Unwashed MDTM-neck patty | 46.30 | +4.2 | +12.45 |

*ground turkey breast meat
**mechanically deboned turkey meat

The normal plotting of residuals confirmed that the assumption of normality was satisfied. The assumption of equal variances was not met. However, the ANOVA will overcome this limitation as long as the sampling in the experiment is properly randomized. The Analysis of Variance resulted in an F value of 16.08 which surpassed the $F^3_{108}$ table value of 2.68 at an alpha level of 0.05. It was concluded that based on the color preferences of the panelists, at least one mean for a treatment was noticeably different from the others. The LSD test at an alpha level of 0.05 (see Table 18 (f)) indicated that there was a significant difference between treatments 5 and 6 and treatments 7 and 8. No significant difference was detected between treatments 5 and 6 or between treatments 7 and 8.

Even though the results in the color parameter noted a significant perceivable difference in color among all treatments, the variations in color preference did not show the same degree of significance. This could mean that if samples had been judged separately, considerable differences in color among them might be smaller. There was no significant perceivable difference in color preference between samples 7 and 8, suggesting that the addition of 20% washed-MDTM-necks to whole breast patties could be within the range of lightness expected for whole breast products. This fact is of tremendous economic importance if we consider that the price for breast muscle in 1983 ranged from $1.37 to $2.05 per pound while for deboned necks the price varied from $0.16 to $0.25 per pound (USDA, 1983).

A statistical analysis of the parameters tested in the four different treatments suggested that the use of ground breast muscle greatly improved the characteristics of the patties. When the results for the two sensory studies were compared, it was observed that the panelists liked the samples containing breast muscle the best. Scores for the different treatments in the second study tended to be higher in most of the parameters tested, giving higher mean values as a consequence. Smaller variances within treatments in the second study indicated that panelists had a more homogeneous opinion about the different products characteristics.

One of those characteristics was texture. Its improvement was not only due to the inclusion of ground breast muscle, but also to the use of raw MDTM-necks instead of the cooked one when making the patties. The cooked MDTM-necks no longer had the same bonding capacity as its raw counterpart, since the cooking process denatured proteins and damaged their functional properties (Vadehra et al, supra, 1970). Patties prepared with raw MDTM-necks had higher shear values in the Kramer Shear Press and higher scores in the panel test. Treatments with a lower breast content (20 and 50%) were perceived as having a rubbery or chewy texture, just like a emulsion-type product. Treatments 7 and 8 did not present the same taste sensation, since panelists commented that both of those treatments more closely resembled a muscle-type product (see Table 21).

The second parameter tested was juiciness. Panelists identified a significant difference between treatment No. 5 and treatments 6, 7, and 8. Samples of treatment No. 5 had about a 3% higher moisture content than those of treatments 6, 7, and 8. People mentioned that treatment 5 was not particularly juicy, but rather greasy. Treatments 6, 7, and 8, which had 71.0–71.8% moisture content, had a dry taste, according to the panelists (see Table 21).

The third parameter analyzed was flavor. Data indicated that all samples were well-received. Panelists gave high scores to all the treatments. They found treatments 7 and 8 the most appealing and having more "chicken" or "turkey" flavor. There were no comments about aftertaste as in the first sensory test. It is also important to point out that no significant difference was found in flavor between the 100% breast meat patty and the patty made with 80% breast muscle and 20% MDTM-necks (see Table 21).

Overall, the statistical analysis revealed that treatments 7 and 8 were the best received by the panelists. In all the parameters tested, no significant detectable difference was found between those two treatments, with the exception of the color parameter. Panelists found treatment 8 lighter than treatment 7. However, the difference in lightness between samples 7 and 8 was not large enough to be statistically significant in the color preference parameter (see Table 21).

breast frames (10.2%). The highest fat content was for MDPM from the whole racks (22.22%). Another effect of fat was found in the color of MDPM. The pastes became lighter and decreased in redness as the levels of fat rose.

The water washings applied in the surimi and kamaboko industries were found helpful in removing the heme pigments out of the meat pastes. However, these three washings by no means extracted the red color completely. Nevertheless, lightness and yellowness of the pastes increased, and their redness decreased. The most dramatic effect of the water washings in color was found in the "a" values (redness) which decreased by 50%.

The introduction of another washing step using a 0.04M phosphate buffer with a pH of 6.8, 7.2, or 8.0 helped to remove more easily the heme pigments from the MDPM. Lightness values in the MDPM increased and "a" values decreased as the pH of the buffer solutions rose. A 0.04M phosphate buffer with a pH of 8.0 was found to be the most effective buffer in extracting the heme pigments, myoglobin, and hemoglobin from MDPM. Based on the color values obtained in the Hunter colorimeter for unwashed MDPM from necks, 0.04M phosphate buffer with a pH of 8.0 improved the color characteristics of the same meat as follows: lightness and yellowness increased in 51.1 and 26.0% respectively while its redness decreased by 64.0%. Reductions in the volume of buffer used for washing MDPM, as well as, the reduction in water washings f(from three to two) did not affect the color values drastically.

The centrifugation of the buffer slurry recovered

TABLE 21

Summary of Results
Objective measurements and panelists scores obtained for the various treatments in the second sensory study.

| Treatments | Juiciness | Moisture Content (%) | Expressible Moisture (%) | Texture | Kramer Shear (lbf) | Flavor | Overall Acceptability | Fat Content (3) (%) | Color | Hunter Color Measurements | Color Preference |
|---|---|---|---|---|---|---|---|---|---|---|---|
| (5) 20% GTBM (1) 80% MDTM-necks (2) | 6.19a | 74.70 | 65.30 | 3.59 | 212.50 | 5.76a | 5.73a | 7.20 | 4.38a | 58.35* | 5.68a |
| (6) 50% GTBM 50% MDTM-necks | 4.73a | 71.80 | 68.60 | 5.24a | 290.80 | 6.30ab | 6.19ab | 6.60 | 4.95b | 59.80 +1.60 +13.20 | 6.05a |
| (7) 80% GTBM 20% MDTM-necks | 4.62a | 71.00 | 65.30 | 5.51a | 303.30 | 6.76bc | 6.76bc | 6.10 | 5.95c | 62.20 +1.35 +14.05 | 6.81b |
| (8) 100% GTBM | 4.35 | 71.00 | 63.80 | 5.16 | 280.50 | 5.96c | 6.95c | 5.60 | 6.59d | +65.60 +0.90 +14.65 | 7.32b |

(1) Ground turkey breast meat
(2) Mechanically deboned turkey breast
(3) West basis
a, b, c, d - Means (n = 37) having the same letter were not significantly different at an alpha level of 0.05
*lightness (L)
**"a" value
***"b" value

SUMMARY

This study demonstrated that the proximal composition of mechanically deboned poultry meat varied greatly according to the kinds of poultry parts utilized in its production. Protein, moisture and fat levels differed in the various kinds of MDPM under study. Fat level played a major role in the levels of the other two components. As the level of skin content in the paste increased, fat content rose while protein and moisture levels decreased. MDPM from skinless necks had the lowest fat content (8.03%) followed by MDPM from from the first washing, increased the yield of the washing processes by 7.5 to 8.0%. The new yield based on the starting material, ranged from 67.5 to 73.0%. The precipitate presented lighter color characteristics than the washed meat, but similar composition in fat and protein content.

The water and buffer washings changed the final composition of the MDPM. Protein content decreased in the range of 2–4% in all washed meats. On the other hand, fat content decreased in 4–6% in MDPM from necks and increased in 1-2% in MDPM from whole racks.

No significant difference in texture of the cooked products was detected when the pastes were mixed at dissimilar times either in a silent cutter or in the Hobart dough mixer. Similar values for texture were obtained when pastes were cooked to a different internal temperature or mixed with various levels of sodium chloride. However, the level of fat in MDPM presented a significant effect in texture at an alpha level of 0.05. Higher values in texture were observed in MDPM products with low fat.

Washing and mixing resulted in a firmer texture in the MDPM products. However, MDPM products displayed a softer texture than whole breast meat products perhaps because of their higher levels in fat and/or the smaller particle size. The gel-type texture was objected by most of the panelists in the sensory evaluation studies. People found the products rubbery and spongy, a texture not expected for a chicken or turkey product.

Combinations of washed MDPM with ground turkey breast resulted in products with lighter color and better flavor. Results from the sensory study indicated no significant difference between the products made of 100% turkey breast and the one made of 80% turkey breast and 20% washed MDPM from necks in the following characteristics: juiciness, texture, flavor, color preference, and overall acceptability. A significant difference between them was obtained in color at an alpha level of 0.05. These results confirmed that washed MDPM from necks could be included in breast muscle products up to a 20% without affecting their overall quality.

Composites

Composites of the invention were made as follows:

After boning, turkey breast was trimmed and formed into a shape which could be sliced into an optimum number of thin breast slices. The breast was then frozen.

The breast was sliced when partially thawed but still in rigid form. One side of a 0.15 cm slice was coated with a 10% Kena/NaCl aqueous solution (NaCl/Kena=3/2 w/w) and then rubbed with a rubber knife at 1° C. to prevent disintegration of the slice during manipulation. The rubbing was continued until a pasty exudate was apparent on the surface of the slice.

The filler materials were mechanically beaten and mixed with 10% Kena/NaCl aqueous solution in a Hobart mixer for 3 minutes.

The beaten filler mixture was applied to the manipulated surface of the thin breast slice, then another similarly mechanically manipulated breast slice was placed upon the filler and the composite pressed by flat surfaces at a pressure of about 8.0 g/cm² (0.11 psi.) to provide a composite that was about 0.7 cm thick.

Thickness:
outside slice=about 0.15 cm
product=about 0.70 cm
Weight ration of filler/outside:
1.7-2.0   1.1-1.5

The composite product have better cooking yield than a solid breast slice.

EXAMPLE 1

For a product with the filler (80% breeder turkey breast +20% MDTM), the yield after microwave oven cooking was 87.72%, as compared to 75.82% yield of solid breast slice.

EXAMPLE 2

For a product with the filler (70% scapular meat +30% washed MDTM), the yield after conventional oven roasting is about 81.7%, as compared to 66% yield of solid breast slice cooked in the same way.

In each instance above and below where the comminuted poultry meat was washed, the washing was accomplished using the buffer preparation described in detail in the beginning of the Examples and employing the washing scheme set forth in FIG. 1.

Additional examples of filler compositions include:
1. 40% washed turkey ground meat+60% scapula meat or breast trimming or mixtures thereof;
2. 20% washed MDTM+80% scapula meat or breast trimming or mix;
3. 20% washed MDTM+40% washed dark meat+40% scapula meat or breast trimming or mix.

TABLE 22

| Sample | Proximate analysis for some turkey products | | | |
|---|---|---|---|---|
| | Moisture | Lipid | Protein | Ash |
| A | 65.41 | 4.35 | 29.01 | 1.23 |
| B | 72.57 | 4.00 | 21.62 | 1.81 |
| C | 72.22 | 4.66 | 21.16 | 1.96 |

Sample A: solid breast meat.
Sample B: filler consists of 40% breeder breast meat, 40% scapula meat, and 20% washed MDTM.
Sample C: filler consists of 80% breeder breast meat and 20% washed mechanically deboned turkey meat (MDTM).

The meat used in this study was mainly from turkey meat. However, similar results may be expected when using chicken meat.

We claim:

1. A method of forming a composite poultry meat product which comprises (a) providing two thin slices of poultry breast meat each having a side mechanically worked to assist binding to a comminuted filler material, the slices having been produced by mechanically roughening one side of two at least partially frozen thin rigid slices of poultry breast meat to raise meat fibers on the surface thereof and cause the release of meat binding proteins at the surface of the meat while not disturbing the integrity and outward appearance of the thin slices; (b) forming a filler comprising comminuted poultry meat comprising at least a minor portion of mechanically deboned poultry meat; (c) positioning the filler between the two mechanically worked inside surfaces of the poultry breast meat slices and pressing the slices together to form a composite laminate essentially free of air pockets to form a unitary composite which when heated is bound so that when sliced the filer portion does not substantially separate from the breast meat slice portion of the composite.

2. A method as in claim 1 where the mechanically deboned poultry meat has been worked to remove at least a portion of its color.

3. A unitary composite poultry meat product comprising a laminate of two thin slices poultry breast meat having integrity and normal outward appearance and having meat fibers raised on their respective inner surfaces, said slices having bound between them a filler portion comprising comminuted poultry meat wherein the comminuted poultry meat comprises mechanically deboned poultry meat in an amount up to about 50% of the filler portion.

4. The product as in claim 3 wherein the filler is comprised of up to about 35% mechanically deboned poultry meat.

5. The product as in claim 3 wherein the filler is comprised of up to about 25% mechanically deboned poultry meat.

6. The product as in 3, 4 or 5 wherein the weight ratio of filler to outside slice meat is between about 1.1 to about 2.5.

7. The product as in claim 6 where meat is turkey meat.

8. The produce of claim 6 where the remainder of the filler comprises ground poultry breast meat.

9. The product as in claim 3 wherein the comminuted poultry meat has been decolorized.

* * * * *